United States Patent [19]

Priem et al.

[11] Patent Number: 5,159,665
[45] Date of Patent: Oct. 27, 1992

[54] GRAPHICS ACCELERATOR SYSTEM

[75] Inventors: Curtis Priem, Fremont; Chris Malachowsky, Santa Clara, both of Calif.

[73] Assignee: Sun Microsystems, Inc., Mountain View, Calif.

[21] Appl. No.: 441,272

[22] Filed: Nov. 27, 1989

[51] Int. Cl.[5] .............................................. G06F 15/62
[52] U.S. Cl. ..................................... 395/134; 395/143
[58] Field of Search ............... 364/518, 521; 340/721, 340/723; 395/135, 133, 134, 138, 141, 142, 143

[56] References Cited

U.S. PATENT DOCUMENTS

| | | | |
|---|---|---|---|
| 4,945,497 | 7/1990 | Malachowsky et al. | 364/518 |
| 4,970,682 | 11/1990 | Beckwith, Jr. et al. | 364/900 |
| 5,020,002 | 5/1991 | Malachowsky | 364/518 |
| 5,117,485 | 5/1992 | Malachowsky et al. | 395/143 X |

Primary Examiner—Heather R. Herndon
Attorney, Agent, or Firm—Blakely, Sokoloff, Taylor & Zafman

[57] ABSTRACT

A graphics accelerator interface apparatus for receiving information to be displayed by a computer and the address of such information. Storing the addresses of vertices of a quadrilateral to be displayed by a computer, translating the addresses of vertices of a quadrilateral into signals representing the relations between each of such vertices and the others of the vertices, selectively decomposing a quadrilateral into line segment portions defining trapezoids which bound sets of scan lines, determining the coordinates of the end points of each scan line within such trapezoids, translating the coordinates of the end points into linear values for display, and storing such information for display on a computer output display.

75 Claims, 20 Drawing Sheets

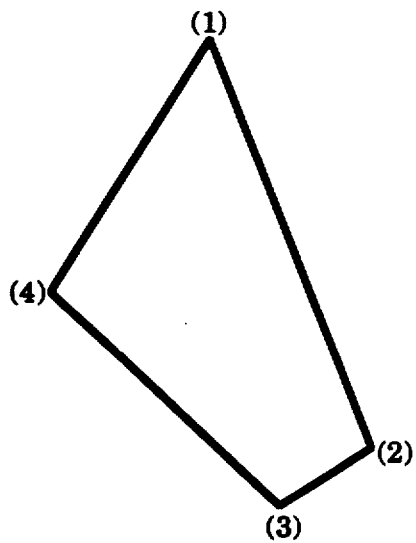
*Figure 5a*
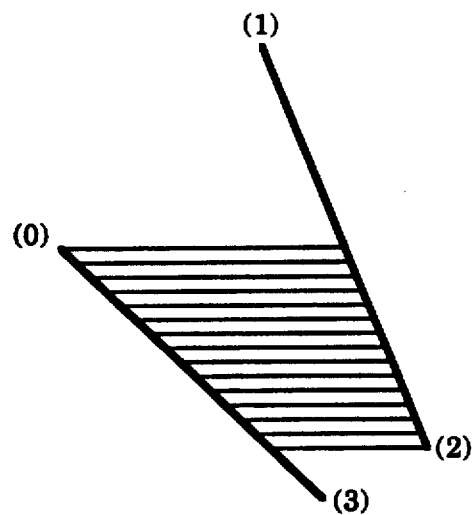
*Figure 5c*
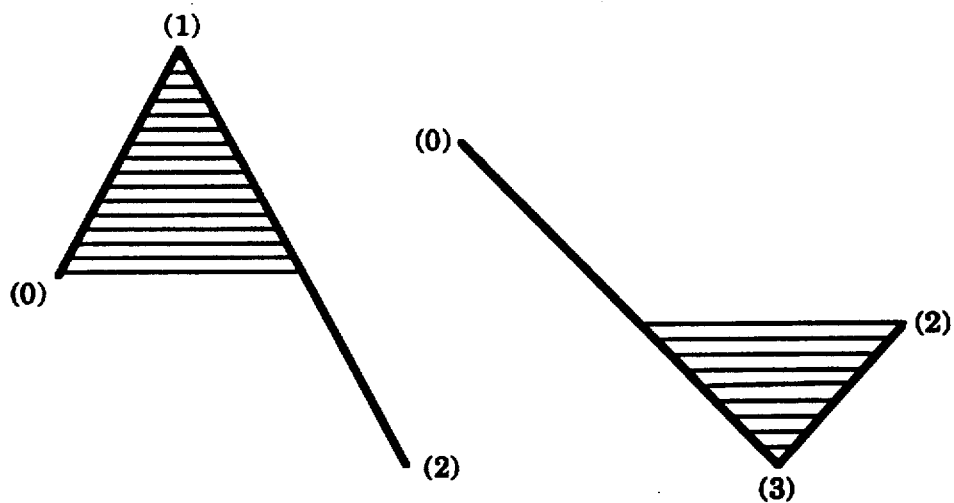
*Figure 5b*
*Figure 5d*
*Figure 5*

POSSIBLE SLOPE COMBINATIONS AND SORT EQUATIONS
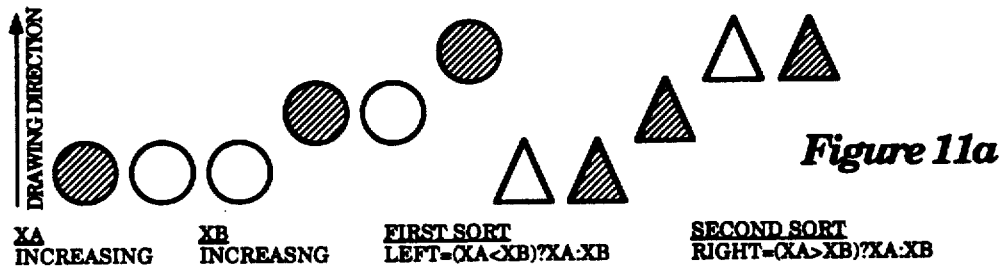
*Figure 11a*
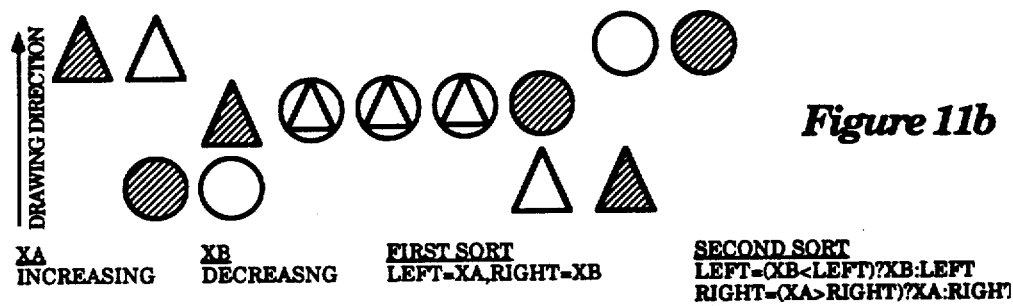
*Figure 11b*
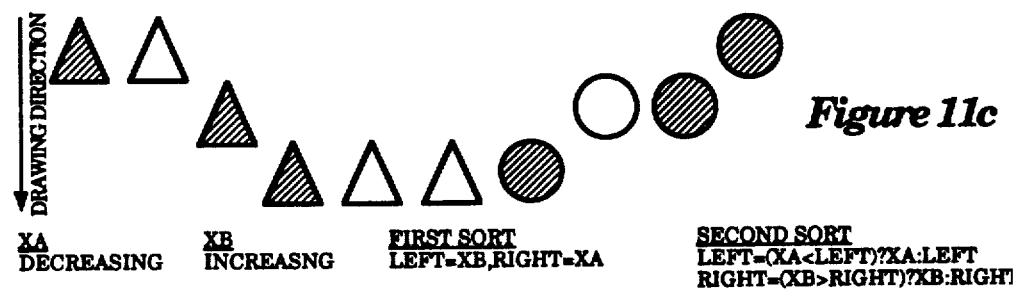
*Figure 11c*
*Figure 11d*
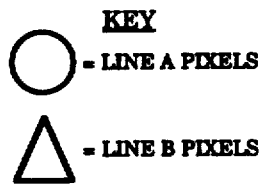
*Figure 11a-d*

GRAPHICS ACCELERATOR SYSTEM

BACKGROUND OF THE INVENTION

1. Field of the Invention

This invention relates to graphics accelerators for use with computer systems and, more particularly, to extremely fast graphics accelerators.

2. History of the Prior Art

The constant emphasis in the design of computer systems has been on making such systems faster and able to handle larger amounts of information so that they may accomplish more work. The ability of computers to do more work is also enhanced by their ability to do more different kinds of work. For example, computers have become of much more use in many more activities with the advent of computer graphics displays which allow the presentation of not only numbers and text materials but pictures and graphs representing the meanings of those numbers and adding to the meaning of the text material. It has gradually become the belief of a great number of people in the computer industry that a graphical output should be presented on almost all computer systems.

Unfortunately, the presentation of a graphics display by a computer system requires a great deal of the processing power of that system. For example, the presentation of a single frame of graphical material on the output display of a fairly standard-sized workstation requires that information regarding approximately one thousand pixels in a horizontal direction and approimately one thoudand pixels in a vertical direction be stored. Thus, information must be stored which relates to approximately one million pixels for each frame to be displayed. In a conventional system which is capable of providing a number of different colors on the display terminal, each of those pixels may contain eight bits of digital information regarding the particular pixel. Consequently, approximately eight million bits of information needs to be computed and stored for each frame to be presented on the output display.

The simple matter of dealing with such a large amount of information in order to present a graphics output occupies a substantial amount of the time available for a central processing unit (CPU) and may substantially slow the operation of even the fastest of such processors. For this reason, it has become common for computer systems to include graphics accelerators capable of assisting the central processing unit in its operations by taking over some portion of the data processing function relating to the display of graphics on the computer output display. This offloading of some portion of the graphics processing functions from the central processing unit to a graphics coprocessor may substantially increase the speed with which any particular computer system is able to process graphics information. However, recently it has become apparent that, at the rate with which new computer systems are being designed and the concomitant rate at which the speeds of central processing units are being increased, graphics accelerators designed to operate with such systems must be redesigned each year for an exponentially increasing number of computers just to maintain their speed advantage over the central processing units.

To emphasize this problem, it has been suggested that the speed with which computer systems are capable of handling information has doubled in every year since the year 1984 and will continue to do so. Moreover, a review of a line of individual computers manufactured by the assignee of this invention shows that a single workstation has become, in five years, a family of more than ten individual workstations based on three individual central processing units designed by three different manufacturers. If only half of the individual computer designs double in speed each year without any increase in the number of different workstations manufactured, it will require that five individual graphics accelerators be designed each year to run with each of these new workstations. This is an inconceivable amount of work for an engineering staff.

One reason that the graphics accelerators designed for computer systems are so rapidly made obsolete relates to the philosophy of the design of those systems. Usually, a computer system is designed and runs well with the applications immediately available for it. As more advanced graphics applications are developed for the system, the system slows; and it becomes apparent that it needs help in processing the graphics information in order to function at a reasonable speed. This gives impetus to the design of a graphics accelerator for that system. The pressures of providing such an accelerator within the time constraints for marketing the accelerator while the computer system remains a significant economic product have caused designers of graphics coprocessors to utilize the latest processor technology and attempt to adapt that technology to the computer system already designed. Usually a microprocessor is utilized as a basis for a graphics coprocessor, and various changes and additions are made to the circuitry of the microprocessor in order to enhance its graphics functions and unburden the processor from some of the constraints normal to the use of that processor as a central processor. Utilizing this design philosophy and the most up-to-date technology, it is possible to design graphics accelerators which are able to speed the graphics functions of the computer system from two to five times over that attainable by the central processing unit without the graphics coprocessor. Such a philosophy is fine, except that with the next faster processor, it is necessary to entirely redesign the accelerator again using newer technology so that the new central processing unit will not be burdened by the speed of its graphics coprocessor. As has been emphasized above, this philosophy of design is self-defeating and a new approach to devising a graphics coprocessor is necessary.

SUMMARY OF THE INVENTION

It is, therefore, an object of this invention to provide a graphics accelerator capable of operating with a number of different central processing units.

It is another object of this invention to provide a graphics accelerator for a computer system capable of operating at speeds such that the speed of operation of a central processing unit associated therewith becomes the speed limiting the operation of the computer system.

It is yet another object of this invention to provide a relatively low cost graphics coprocessing unit.

These and other objects of the invention are realized in a graphics accelerator system which comprises a multisynchronous interface for adapting to a plurality of central processing units, means for providing figures generated by the central processing unit to a frame buffer for display by an output display, means for transferring information from one position in the frame buffer to another position in the frame buffer, means for drawing quadrilateral figures on the computer output display, and means for accomplishing matrix arithmetic with respect to figures to be drawn on the computer output display, each of said foregoing means being capable of operating at the speed with which the frame buffer is capable of accepting information.

These and other objects and features of the invention will become apparent to those skilled in the art by reference to the following detailed description taken together with the several figures of the drawing in which like elements are referred to by like designations throughout the several views.

BRIEF DESCRIPTION OF THE DRAWINGS

FIGS. 5(a)-5(d) illustrate a quadrilateral figure to be displayed and various sub-portions thereof;

FIG. 11 (a-d) are diagrams useful in illustrating the operation of the circuitry of FIG. 12;

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Overview

Figure 1:
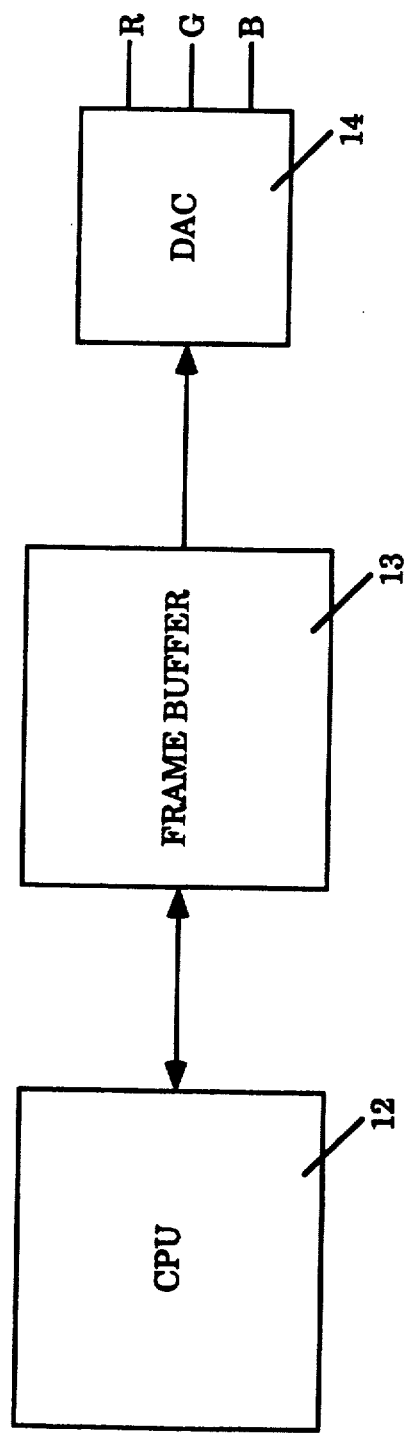
FIG. 1 is a block diagram illustrating a minimum arrangement of components for providing graphics for a computer output display.

Referring now to FIG. 1 there is shown a block diagram illustrating the minimum arrangement of components which may be used to provide a color graphics output display on a computer system. The computer system 10 includes a central processing unit (CPU) 12, a video memory or frame buffer 13, and a digital-to-analog converter 14. The central processing unit 12 may for the purposes of this discussion be considered to include all of the system memory, input/output circuitry, and other circuitry necessary for providing output to a computer output display. The frame buffer 13 in an exemplary embodiment may be adapted to provide approximately one million pixels of color information for display on an output display monitor (not shown in the figure). In an exemplary embodiment, the frame buffer 13 is capable of providing eight bits of storage for color information at each pixel so that the frame buffer includes approximately one megabyte of storage space. The digital-to-analog converter 14 provides three color output, red, green and blue, for display on a computer color monitor in accordance with principles well-known in the art.

It will be appreciated by those skilled in the art that with a central processing unit 12 providing graphical output information to the frame buffer 13, the system will operate as fast as information can be provided by the central processing unit 12. If the central processing unit 12 is relatively slow, then the system 10 will provide graphical output in a generally lackadaisical fashion; and, if the central processing unit 12 is very fast, then the system 10 will provide graphical output more rapidly. This is true until the point is reached at which the central processing unit 12 is able to furnish information at the top rate at which the frame buffer 13 is able to receive information (the input band width of the frame buffer 13). With most systems presently in existence, this has not happened. However, if the central processing unit 12 were to be considered to be infinitely fast, then the limiting factor for the processing of information through the frame buffer 13 would be the input bandwidth of the frame buffer 13. In a presently preferred system having approximately one megabyte of video memory, utilizing thirty-two chips of DRAM memory (each sixty-four kilobits by four bits) and having a system bus sixty-four bits wide cycled twice for each one hundred twenty nanosecond cycle, the input bandwidth of the frame buffer is one hundred thirty-three megabytes per second. The frame buffer will be able to handle information furnished to it at speeds up to that bandwidth.

Figure 2:
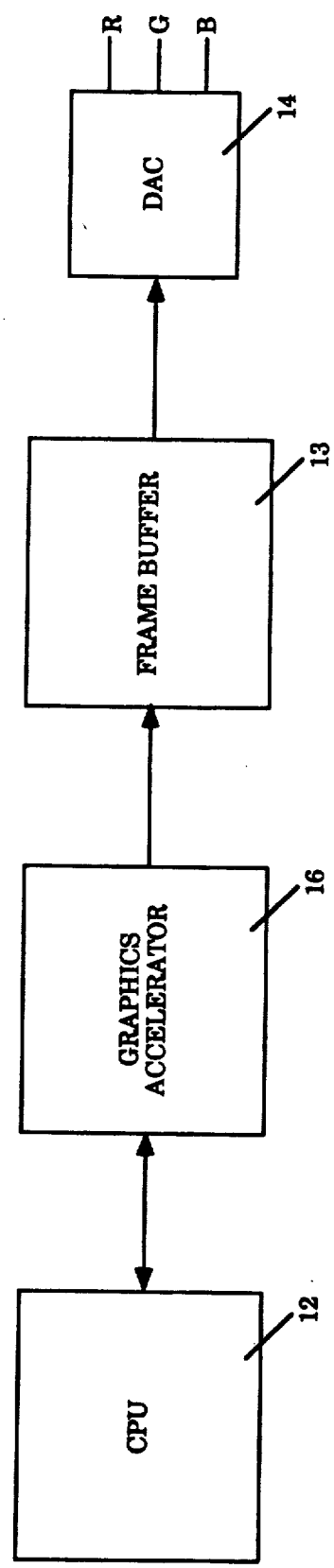
FIG. 2 is another block diagram helpful in illustrating various design principles of the invention.

FIG. 2 illustrates a second system 15 having a central processing unit 12, a frame buffer 13, a digital-to-analog converter 14, and a graphics accelerator 16. It has been found that if the graphics accelerator 16 is designed to speed up the operation in the central processing unit 12 by using the same state of the art processor technology as is found in the central processor, then the acceleration of the operation of the system will at best increase from two to five times the speed at which the central processing unit 12 can provide information to the frame buffer 13.

On the other hand, if the graphics accelerator 16 were designed in such a manner that it could provide information to the frame buffer 13 at the preferred bandwidth, then the operation of the central processing unit 12 would not be limited by the speed of the graphics accelerator 16. Moreover, in such a case, an increase in the speed of the central processing unit 12 would only increase the speed at which the system 15 is able to provide output to an output display by directing accelerator 16 to perform it operations at an increased rate. Consequently, it is a very important design criteria that the graphics accelerator of this invention be capable of operating at the bandwidth of the frame buffer with which it is associated.

Moreover, in order that a new graphics accelerator need not be designed for each central processing unit for which it is associated, it is another important design criteria that the graphics accelerator of the present invention operate with a large number of individual types of central processing units.

Although it is conceivable that the foregoing desiderata might be accomplished at a very high cost, it is quite unlikely that such a high-cost graphics accelerator would find its way into a large number of computer systems actually sold. Unless a large number of computer systems are sold using such a graphics accelerator, software will not be written for the graphics accelerator. If software is not written for a particular graphics accelerator, the accelerator will not be purchased and used. Consequently, although such an accelerator might be quite useful, its expense would preclude it from satisfying the needs of the marketplace. Therefore, it is another design criteria that the graphics accelerator of this invention be relatively low-cost so that it becomes a standard part of a very large number of computer systems.

Figure 3:
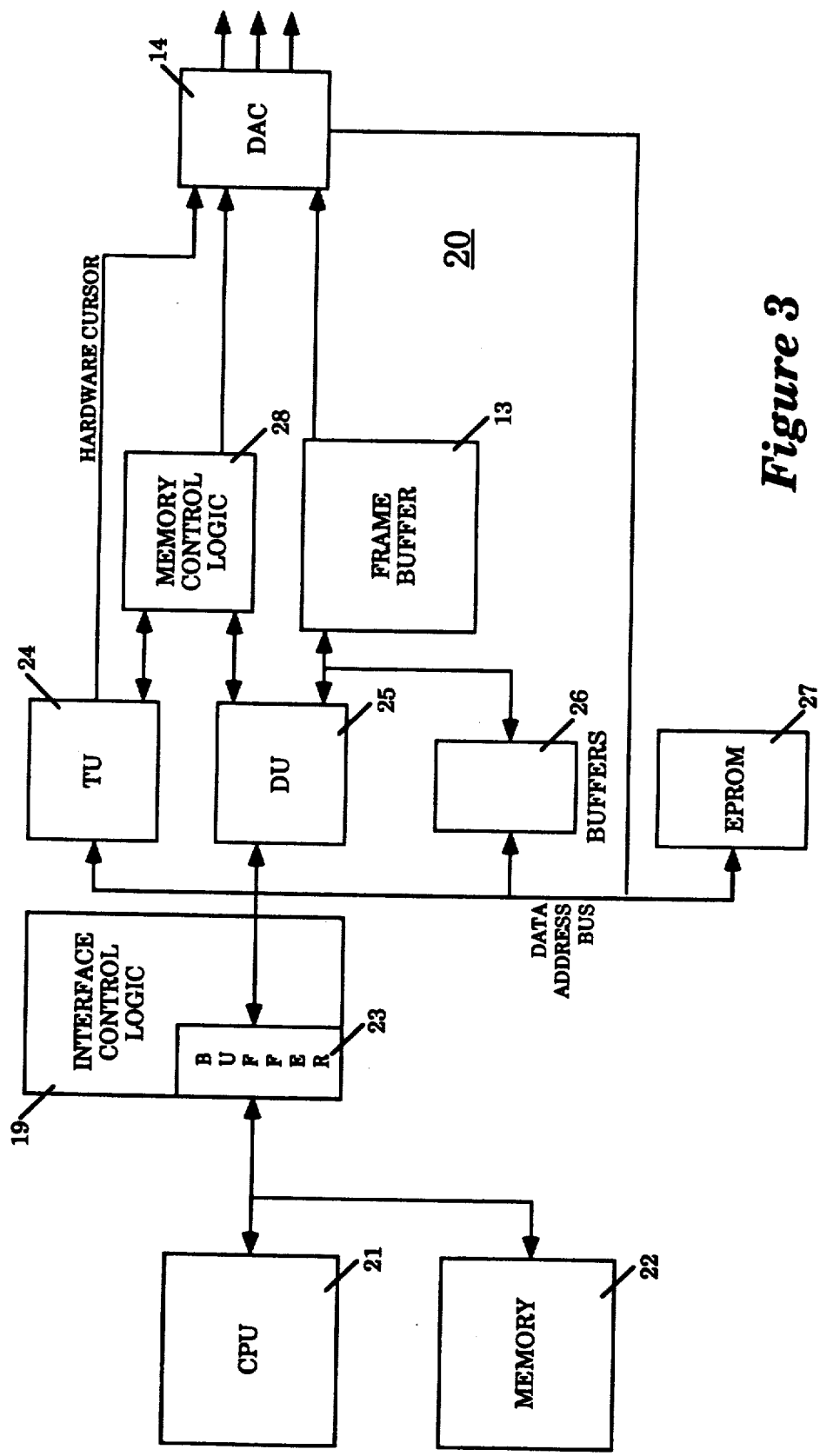
FIG. 3 is a block diagram illustrating the graphics accelerator system of this invention.

FIG. 3 illustrates in block diagram form a relatively low-cost graphics accelerator 20 designed in accordance with the present invention which is capable of operating at the bandwidth of the frame buffer as above-described and is adapted to function in association with a number of central processing units, more particularly, the Sun SPARC RISC central processors, the Intel microprocessors of the line including the 8088, 8086, 80186, 80286, and 80386 processors, and the Motorola 68000, 68020, and 68030 microprocessors and improvements to such processors. The graphics accelerator 20 illustrated in FIG. 3 is associated with a central processing unit 21, and system memory 22. The accelerator 20 includes a buffer unit 23 interposed between the central processing unit and the graphic accelerator 20 to be described hereinafter. The buffer 23 is operated under control of interface control logic 19 which is included therewith. The system 20 transfers information through the buffer 23 on data and address buses to a transformation unit (TU) 24, a drawing unit (DU) 25, buffer storage 26, and an EPROM 27.

The transformation unit 24 accomplishes the mathematical matrix operations required to rotate, transform, and scale graphical information. The transformation unit 24 also includes a novel arrangement for providing an internal number format from and to which numbers in a plurality of different number formats may be rapidly transferred; this arrangement significantly assists in maintaining the high speed of operation of the accelerator 20.

The drawing unit 25 provides circuitry for rapidly drawing quadrilaterals, for accomplishing block transfers, and for writing characters or images furnished by the central processing unit 21 to the output display (not shown). The buffers 26 provide a path for the flow of data directly into or out of the frame buffer 13 so that direct memory access may be accomplished. The system 20 also includes memory control logic 28 which sends and receives control information to and from the transformation unit 24 and the drawing unit 25 and provides control signals to the frame buffer 13 and the digital-to-analog converter 14 for transferring information to the output display which is not illustrated. The EPROM 27 allows the graphics accelerator to identify itself to other units in a computer system and provides various access routines to be used by a host at power-up and boot-up time before access is allowed to the operating system software and device driver software.

The system of the present invention drastically accelerates the presentation of graphics on a computer output display by employing a design philosophy which first determines the speed at which the frame buffer is capable of receiving information (i.e. its input band width) and then provides accelerator circuitry which meets that speed. In the preferred embodiment of the invention, a frame buffer capable of storing information relating to approximately one thousand pixels in the horizontal direction by approximately one thousand pixels in the vertical direction is utilized. This frame buffer size was chosen because it could be constructed of conventional random access memory which was readily available at a relatively inexpensive price thereby assisting in keeping the cost of the system as low as possible. A particular frame buffer was actually constructed of thirty-two memory chips, each providing storage for 256 kilobits of information and each being organized sixty-four kilobits by four bits thereby providing one megabyte of storage. Utilizing such a frame buffer, it is possibe to store one million pixels of display information with eight bits of storage space for information (such as color) at each pixel.

Utilizing such a frame buffer constructed of the aforementioned random access memory, it was determined that an input band width of one hundred thirty-three megabytes per second of information could be attained. Consequently, it was necessary to provide a graphics accelerator which was capable of supplying information to the frame buffer at this rate. As was demonstrated above, if information can be supplied by the graphics accelerator to the frame buffer at that rate, then the limiting speed is that of the central processing unit itself.

Assuming that the graphics accelerator is able to provide information to the frame buffer at the band width at which the frame buffer is capable of accepting information, then the operation of the central processing unit may be enhanced by relieving it of most of those functions associated with the processing of graphics. In presenting graphics on an output display, most central processing units of computer systems accomplish most of the graphics operations in software. Even when the central processing unit is assisted by a graphics accelerator, such a graphics accelerator usually simply provides microcode for performing the same operations as are performed by a central processing unit through its graphics software. Consequently, since the software operations performed by a central processing unit are performed serially, the microcode operations are usually performed in the same manner and take a great deal of time.

The normal functions accomplished by a central processing unit in providing graphics displays, for example, include furnishing anti-aliasing features in order to remove the jagged appearance of lines on the display; accomplishing matrix arithmetic in order to move figures about on the display, to scale figures, to cause them to recede from view, and the like; clipping the graphics images to fit within a window on the display; doing various raster operations by which data is merged into the data presently held in the frame buffer; drawing the cursor and assisting in its movement; and doing all of the steps necessary for rendering the graphics object itself on the output display. The graphics accelerator of the present invention relieves the central processing unit of most of these tasks so that the central processing unit is capable of accomplishing its other operations at a much faster rate. In the system of the present invention, the graphics tasks of the central processing unit are essentially limited to providing to the graphics accelerator the vertices of particular images to be displayed on the output display, providing the color data to be displayed for such images, and carrying out the few graphics related operations which the graphics accelerator is unable to accomplish. This elimination of graphics tasks, allows the central processing unit to complete its other tasks much faster so does the entire computer system completes operations more rapidly.

The graphics accelerator of the present invention realizes its great speed by a number of unique arrangements for processing the graphical information. For example, the drawing unit 25 of the graphics accelerator 20 of the present invention utilizes a single drawing algorithm for drawing all images to be presented on the output display. The image which the graphics accelerator 20 utilizes is a quadrilateral figure having straight lines joining each of the four vertices. The accelerator 20 utilizes the same algorithm to describe degenerate quadrilateral figures such a triangles, lines, and points. Since the basic algorithm implemented by the graphics accelerator of this invention renders the degenerate quadrilaterals as rapidly as they can be handled by the frame buffer, there is no need for special algorithms to draw them. The quadrilaterals provided by the basic algorithm may be combined to build other polygonal figures to be described on a graphics display. There is no necessity to provide a general algorithm for drawing polygons since polygons as well as lines, triangles, and points may be drawn by the quadrilateral drawing algorithm within the limits of the speed at which the frame buffer can accept information. The realization of this fact goes a long way both toward improving the speed of operation of the graphics accelerator and reducing its cost to the practical. Consequently, the provision of a single drawing algorithm implemented in hardware eliminates a substantial amount of the circuitry which would otherwise be necessary to allow a graphics accelerator to provide images of different shapes.

It has been determined that the drawing unit of the present invention is capable of providing over ninety percent of the graphical elements utilized in presenting two-dimensional figures and approximately seventy-five percent of the elements necessary for presenting three-dimensional figures on an output display. Those few tasks which the graphics accelerator of the present invention is incapable of accomplishing are recognized by the graphics accelerator and handed off to the central processing unit so that the central processing unit may make use of the extra time which it has to implement these lesser used functions.

Another reason the graphics accelerator of this invention is able to operate at such a high speed is that all of the clipping functions necessary to place a figure within a rectangular window are accomplished in hardware thereby eliminating the sequential application of software by the central processing unit to the vertices of each quadrilateral to be drawn and the edges of each clip window. Moreover, the graphics accelerator of this invention is capable of accomplishing a number of unique functions related to clipping which help to speed the operation of the system. For example, the direction in which a graphics image is drawn to the frame buffer (up or down, right or left) often determines the speed of the operation. The graphics accelerator of the present invention is capable of determining the fastest direction in which a graphics image may be drawn to the frame buffer and operating to draw the image in that direction. As another example, it is sometimes faster to let software accomplish clipping where a figure lies far outside a clip window. The graphics accelerator of this invention is capable of determining when it is faster to let software rather than hardware accomplish clipping and so indicates to provide the most rapid operation of the system.

Another reason the graphics accelerator of this invention is able to operate at such a high speed is the provision of a new internal number format utilized in the processing of all matrix mathematics operations in the transformation unit. This internal number format is particularly suited to accomplish translation between the various standard number formats and the internal number format at a rate capable of supplying the information at the frame buffer band width. Moreover the use of the new internal format to process all matrix mathematics operations in the transformation unit eliminates a substantial number of translations between formats which are typically needed when utilizing prior art matrix mathmatical units. A comparison of the speed of the transformation unit of the present invention, for example, in processing floating point numbers utilizing the internal format and conventional matrix operations shows that for most operations, the graphics accelerator actually runs at a faster rate to produce the results of floating point operations than does a conventional floating point co-processor which might otherwise be utilized for such operations in a computer system not equipped with the graphics accelerator of the present invention.

As pointed out, if the graphics accelerator of the invention runs at the desired memory bandwidth, it is always as fast or faster than a central processing unit running the same operations in software. However, for a graphics accelerator to maintain its advantage against a central processing unit, its interface with the central processing unit (how it is instructed what to do) must be efficient so that its performance gain actually doing the operation is not wiped out by the act of finding out what to do. The graphics accelerator of the present invention includes an especially efficient interface with those processors with which it operates to maintain this efficiency.

In addition to the aforementioned philosophical changes in approach utilized in designing the system of the present invention, each stage of the graphics accelerator is designed to optimize the rate at which it processes information so that the system may provide information to the frame buffer at its input band width.

System Operations of The Drawing Unit

The drawing unit of the graphics accelerator of the present invention is capable of performing essentially three overall functions. These are to draw a graphics image when furnished the vertices of the particular image (a drawing operation), to transfer blocks of information from one position to another on the computer output display (a block transfer operation), and to display images furnished in completed form by the central processing unit (a font operation). In view of the fact that the major portions of the drawing unit of the graphics accelerator are utilized in providing the drawing operations of this invention, that operation will be discussed first. Many of the components of the system used in providing the drawing function are also utilized, as will be appreciated by those skilled in the art, in providing both the block transfer operation and the font operation.

Figure 4:
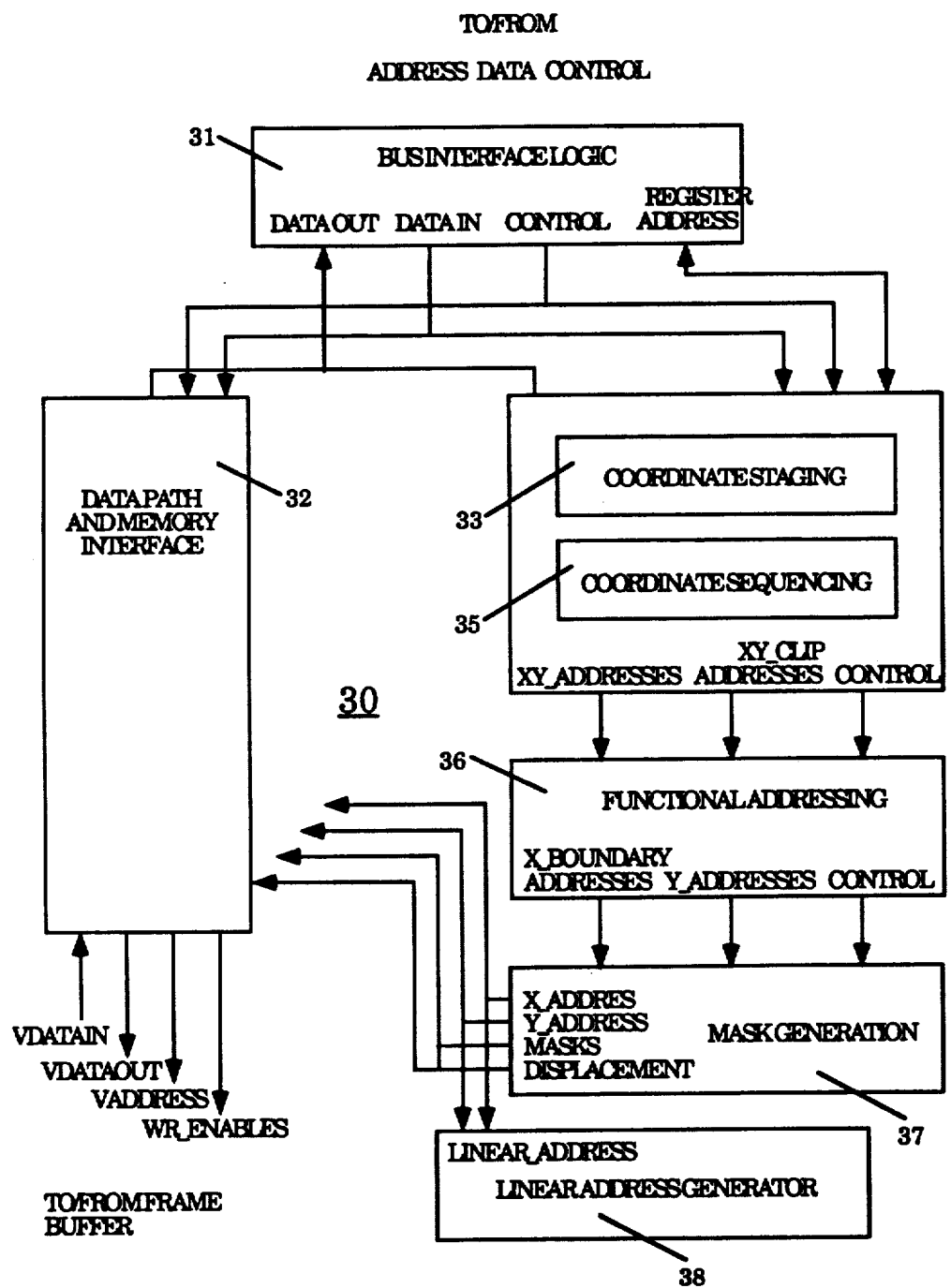
FIG. 4 is a block diagram illustrating functional portions of the drawing unit of the graphics accelerator of the present invention.

FIG. 4 illustrates in block diagram form a drawing unit 30 constructed in accordance with the invention which may be used with a general purpose computer system. The system includes bus interface logic 31 which receives information regarding the desired graphical shape to be drawn from the central processing unit (not shown in this figure). The bus interface logic 31 receives on address lines information which designates the particular portion of the graphics accelerator system to which the input is to be transferred. The bus interface logic 31 receives on input data lines the actual data such as the color description of each pixel to be rendered. The bus interface logic 31 also receives on control lines control signals designating the manner in which the information is to be treated.

When constructing graphical representations from quadrilaterals in accordance with the present invention, the input information provided includes among other things the coordinates of a particular clip window in which the information is to appear, the coordinates (vertices) of the quadrilateral to be described, and the color or other data regarding each quadrilateral. The color information which is to be presented at the display is stored in a data path and memory interface stage 32. The vertices of the quadrilateral to be described and the coordinates of the clip window are stored in coordinate staging circuitry 33 which includes hardware that provides comparisons of the incoming address information by means such as registers, magnitude comparators, and gating circuits.

The comparisons made include the comparison of each X value of each vertex of any quadrilateral to be described to each other X value of each of the other vertices of the quadrilateral, the comparison of each Y value of each vertex of the quadrilateral to each other Y value of each of the other vertices of the quadrilateral, and the comparison of each of the X and Y values of all of the vertices to the edges of the clip window in which the information is to be presented. Additional comparisons are made between the vertices of any quadrilateral and the edges of a test window surrounding the clip window for purposes to be explained in detail below. These comparisons are accomplished in hardware by circuitry to be described so that the information is immediately available for use by the system without any reference back to the central processing unit and without any loss of system clock time.

The information regarding the vertices of the quadrilateral and the clip window available at the coordinate staging circuitry 33 is presented to a coordinate sequencing stage 35 at which the quadrilateral to be drawn is decomposed into a series of subportions, each of which is bounded by two line segments of the original quadrilateral; and the vertices of these sub-portions are derived. Each of these sub-portions is chosen such that the line segments define an area of the quadrilateral which may be drawn by a series of parallel horizontal scan lines on the output display, each defined by an X beginning value lying on one of the outer line segments and an X ending value lying on the other. In essence, the two line outer segments of each sub-portion subtend as many Y (horizontal) scan lines as is possible in view of the shape of the quadrilateral to be drawn. When all of the scan lines of all of the sub-portions are combined and rendered on the display, the quadrilateral is defined in total.

This is shown in FIG. 5 which illustrates a single quadrilateral divided into subportions in accordance with this invention. The quadrilateral which is decomposed is shown in FIG. 5(a) having vertices 0 through 3, and the subportions thereof are illustrated in FIGS. 5(b–d). As may be seen in FIGS. 5(b–d), each subportion includes, when presented on an output display, a series of horizontal scan lines which begin at one outer line segment defining the quadrilateral and end at another such outer line segment. The scan lines for each subportion of the quadrilateral thus define trapezoidal (or degenerate trapezoidal) subportions of the original quadrilateral. When the horizontal scan lines of all the trapezoidal sub-portions are scanned to the frame buffer for presentation on the output display, the entire quadrilateral shape is reconstituted for presentation on the display.

Referring again to FIG. 4, after the quadrilaterals have been decomposed into sub-portions and the vertices of the line segments defining those sub-portions have been determined, the individual scan lines falling within the trapaziodal sub-portions have their beginning and ending X values which fall on the outer line segments determined at a functional addressing stage 36. In the preferred embodiment of the invention, this is accomplished by the use of circuitry which determines simultaneously for both outer line segments of each line segment pair the particular pixels constituting the X values at the beginning and end of each scan line within the decomposed sub-portions of the quadrilateral. This portion of the functional addressing stage 36 also provides hardware clipping to fit the particular quadrilaterals to the top and bottom of the clip windows. A next portion of the functional addressing stage 36 sorts the line segments provided in accordance with the direction in which the images have been handled, provides hardware clipping to fit the right and left boundaries of the quadrilateral to the clip window, and then transfers the signals to a mask generation stage 37 which arranges the information into sixteen pixel portions that together traverse from the beginning to the end of the visible portion of each quadrilateral for each scan line. This logic (stage 37) is used for addressing the data path and memory interface stage 32. The mask generation stage 37 is used in the present invention to assure that information which may have been generated in either up or down order and from left to right or in reverse is presented in appropriate order for scanning into the frame buffer.

The signals generated at the mask generation stage 37 are also furnished to a linear address generator 38 which translates the addresses provided by the mask generation stage 37 into signals for linearly addressing the frame buffer for the output display. The apparatus and method of translating the addresses available at the mask generation stage 37 into addresses which may be utilized to serially scan the color data into the frame buffer and the output display is included within this linear address generator 38. This circuitry allows the translation to be accomplished by the use of a minimum amount of gating circuitry while providing a number of useful levels of resolution.

Particular Circuitry of the Drawing Unit

Bus Interface With Central Processing Unit

In order to allow the use of the graphics accelerator of the present invention with a plurality of different central processing units, a bus interface 31 is provided which is capable of working with both synchronous and asynchronous input. Such an interface 31 is illustrated in block diagram in FIG. 6(a-c) of the drawings. In the case of a synchronous input, the central processing unit and the graphics accelerator operate on the same clock. In the case of an asynchronous input, the central processing unit and the graphics accelerator operate on different clocks. As will be noted, the bus interface 31 is capable of accepting input every two clock cycles so that it is able to maintain the appropriate rate for providing input at the band width of the frame buffer.

Figure 6A:
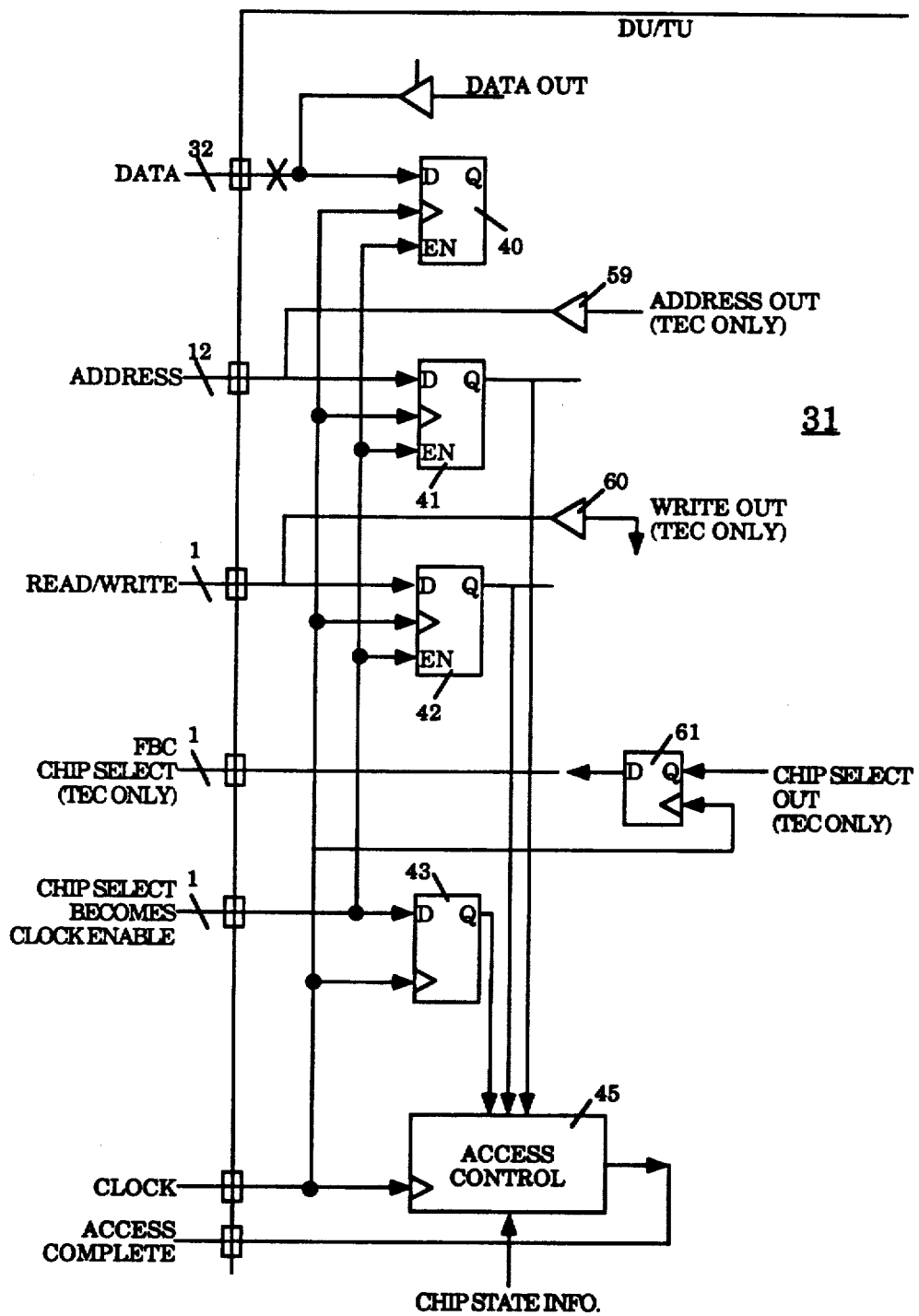
FIG. 6(a-c) are block diagrams of a bus interface utilized in the invention.

Referring now to FIG. 6(a), there is shown a block diagram of the basic bus interface 31 utilized in this invention. The interface 31 comprises a number of D flip-flops 40, 41, and 42 each with a clock enable input. The flip-flops 40, 41, and 42 receive information input on data, address, and read/write lines, respectively. On the receipt of a clock pulse and an enabling signal, the information presented at the D input terminal is transferred to the Q output terminal of each of these flip-flops 40, 41, and 42 and remains there until new information appears at the appropriate D input terminal and is transferred by the simultaneous appearance of a clock and an enable signal.

The enable signal for each of the flip-flops 40, 41, and 42 is derived from a chip select input line which furnishes signals to the D information input terminal of a D flip-flop 43. The chip select signal is provided as output at the Q terminal of the flip-flop 43 upon the appearance of a clock pulse. The Q terminal output of flip-flop 43 is furnished to an access control circuit 45 as are the signals furnished at the Q output terminals of the flip-flop 42 and of the flip-flop 41. The access control circuitry 45 also receives a clock input and a chip state information signal from the coordinate staging unit 33. As will be described, the chip state information signal indicates that the graphics accelerator 30 is capable of handling the particular requested operation. The access control circuit 45 provides an output indicating when access has been completed.

Figure 6B:
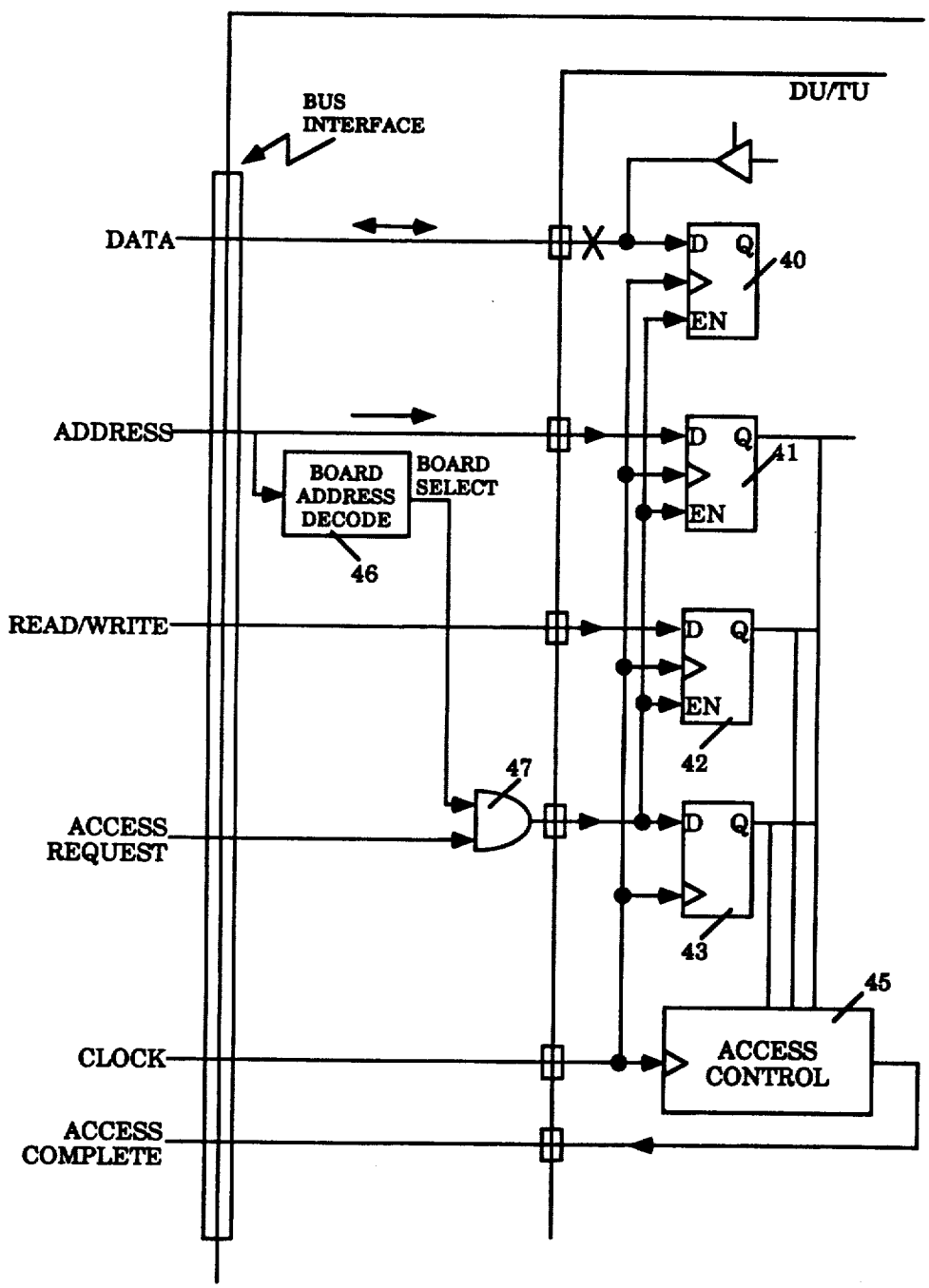

FIG. 6(b) illustrates the circuitry of FIG. 6(a) in a synchronous bus interface arrangement which includes, in addition to the circuitry described above, a board address decode circuit 46 and an AND gate 47. In such an arrangement, the data is provided as input on the D terminal of the flip-flop 40, the address is provided as an input on the D terminal of the flip-flop 41 and to the board address decode circuit 46. At the board address decode circuit 46, a comparison is made with the address range of the graphics accelerator 20 to determine that the circuitry addressed is within the graphics accelerator 20. The result of a valid comparison provides a board select signal which is transferred to the AND gate 47. The board select signal is ANDed with an access request signal to provide an input signal used as the chip select input signal described above. This chip select signal is provided to the D terminal of the flip-flop 43 and as an enable signal to the flip-flops 40, 41, and 42. The read/write, clock, and access complete signals are as described above with respect to FIG. 6(a).

In operation, data and address signals appear coincidentally in a synchronous bus interface on the input data and address lines. The system clock appears on the clock line shown in FIG. 6(b). The address signal is compared at the board address decode circut 45 with the graphics accelerator addresses and provides a signal to the AND gate 47. When an access request signal appears, the AND gate 47 provides an enabling signal at the flip-flops 41, 42, and 43. Thus, the synchronous interface circuitry simply utilizes the system clock to drive the internal circuitry of the graphics accelerator and provides the signals described above for further use by the system.

Figure 6C:
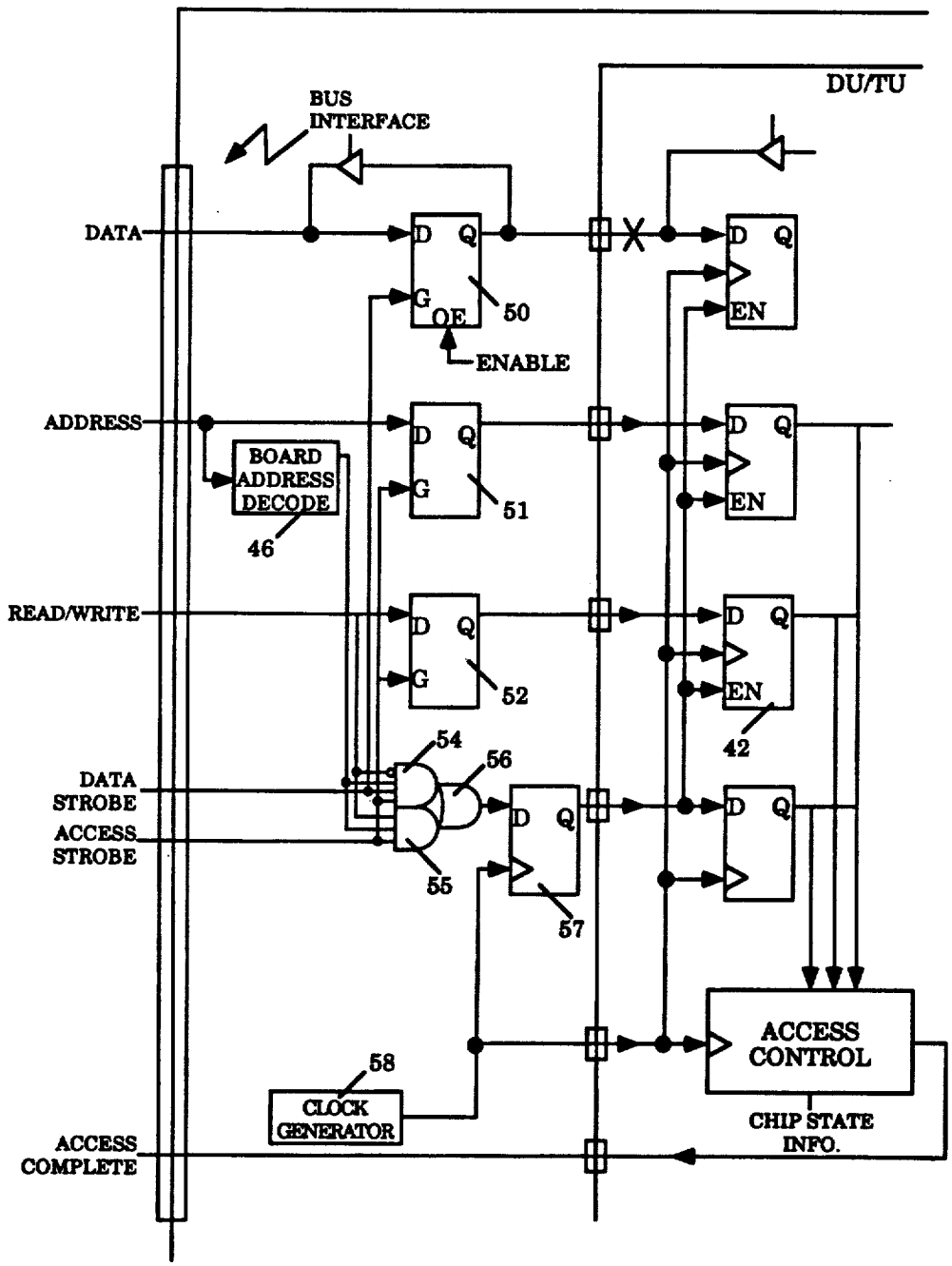

FIG. 6(c) illustrates the additional interface circuitry necessary for accomplishing connection in an asynchronous system. The circuitry includes a D latch 50 with tri-state outputs which receives the data signal at its D input terminal and a data strobe signal at its G input terminal. The D latch 50 also includes an output control (OE) terminal which when asserted drives the data from the D input terminal to the Q output terminal so long as the signal on the control terminal remains asserted. When the signal on the control terminal is deasserted, no signal flows from the D to the Q terminals of the flip-flop 50.

The address signal is received at the D terminal of a D latch 51 which also receives an address strobe signal at its G terminal and during the continuation of the address strobe provides the address at the Q output of the D latch 51. The address continues at the Q output terminal of the D latch 51 even when the address strobe signal is deasserted until the provision of a new address and a new address strobe signal. As with the circuitry shown in FIG. 6(b), a board address decode circuit 46 is provided for comparing the input address with addresses of the graphics accelerator 30 of this invention; and a board select output signal is derived therefrom.

A read/write signal is provided at the D input terminal of a D latch 52 which receives the address strobe signal at its G terminal. The read or write signal is transferred from the D to the Q terminal of the D latch 52 by the address strobe signal and remains at the Q-terminal when the address strobe is deasserted until the provision of a new read/write and new address strobe signal.

The asynchronous interface illustrated in FIG. 6(c) also includes an AND gate 54, an AND gate 55, an OR gate 56, a D flip-flop 57, and a clock generator 58. If a write signal is received and both address and data strobe signals have arrived, an address within the graphics accelerator 20 will provide a board select signal to the AND gate 54. All of these signals appearing coincidentally will cause a signal to be transferred by the OR gate 56 to the D input of the D flip-flop 57.

At an asynchronous interface where the two systems joined by the bus operate at different clock frequencies, it is necessary that the incoming and outgoing handshake signals be synchronized to each of the two systems as they travel in each direction. Consequently, an incoming write signal must be synchronized to the clock of the receiving system. This is accomplished by two stages of flip-flops on each handshake line, each stage being driven by the clock of the system receiving the particular signal. An incoming signal causes the first stage flip-flop to begin switching; and, because of the timing differential between the clock pulse of the receiving system and the incoming signal, the first flip flop may assume a metastable condition, erratically switching between states until finally settling into one of the two possible states. If the first stage assumes the correct state, the input is synchronized to the clock of the accelerator 20. If not, the first stage will assume the correct state on the next clock. In either case, the final output of the first flip-flop causes the second flip-flop to take a state thereby isolating the dithering of the first flip-flop from the receiving system. The state of the second flip-flop will be synchronized to the clock of the receiving system.

Thus, upon receipt of a clock signal from clock generator 58, the flip-flop 57 will stabilize in one condition or the other. If this is the correct state for the clock to enable the transfer of the signal at the D terminal, then the signal is transferred to the Q terminal of the flip-flop 57 and becomes the chip select signal for the flip-flop 43 and the enabling signal for each of the flip-flops 40, 41, and 42. If the flip-flop 57 settles into the wrong state, then the succeeding clock pulse will cause the flip-flop 57 to switch to the state to provide a chip select signal; and the system will be appropriately synchronized with the clock pulses provided by the clock generator 58.

It should be noted that provision is made in the circuit of FIG. 6(a) for transferring signals from the transformation unit 24 back to the drawing unit 31 to operate the graphics system. These are illustrated by dotted lines and include the tri-state buffers 59 and 60 shown in FIG. 6(a) and the chip select out circuit 61 also shown in FIG. 6(a). It will be appreciated by those skilled in the art that with this arrangement the transformation unit 24 may be utilized, once it has received and accomplished the appropriate matrix operations on the data, for driving the drawing unit, or for the transfer of the derived signals back to a particular system processor for use in other circuitry.

It will by appreciated also be those skilled in the art, that the provision of either synchronous or asynchronous interface circuitry such as that shown in FIGS. 6(a-c) allows the present graphics accelerator to be utilized with a wide range of central processors and bus interface structures. This design feature assures that the redesign of the graphics accelerator is not necessary simply because a different family of processors is utilized as the central processor for a computer system.

Coordinate Staging Unit

The coordinate staging unit 33 receives information from the bus interface logic 31 described above. This coordinate staging unit is described in detail in copending U.S. patent application Ser. No. 07/279,590, *Apparatus and Method for Loading Coordinate Registers for Use with a Graphics Substation Utilizing an Index Register*, Priem and Malachowsky, filed Jan. 13, 1989; in copending U.S. patent application Ser. No. 07/297,475, *Hardware Implementation of Clipping and Inter-Coordinate Comparison Logic*, Priem and Malachowsky, filed Jan. 13, 1989; in copending U.S. patent application Ser. No. 07/297,604, *Apparatus and Method for Processing Graphical Information to Minimize Page Crossings and Eliminate Processing of Information Outside a Predetermined Clip*, Priem and Malachowsky, filed Jan. 13, 1989; and in copending U.S. patent application Ser. No. 07/297,093, *Apparatus and Method for Using a Test Window in a Graphics Subsystem Which Incorporate Hardware to Perform Clipping of Images*, Priem and Malachowsky, filed Jan. 13, 1989.

Figure 7:
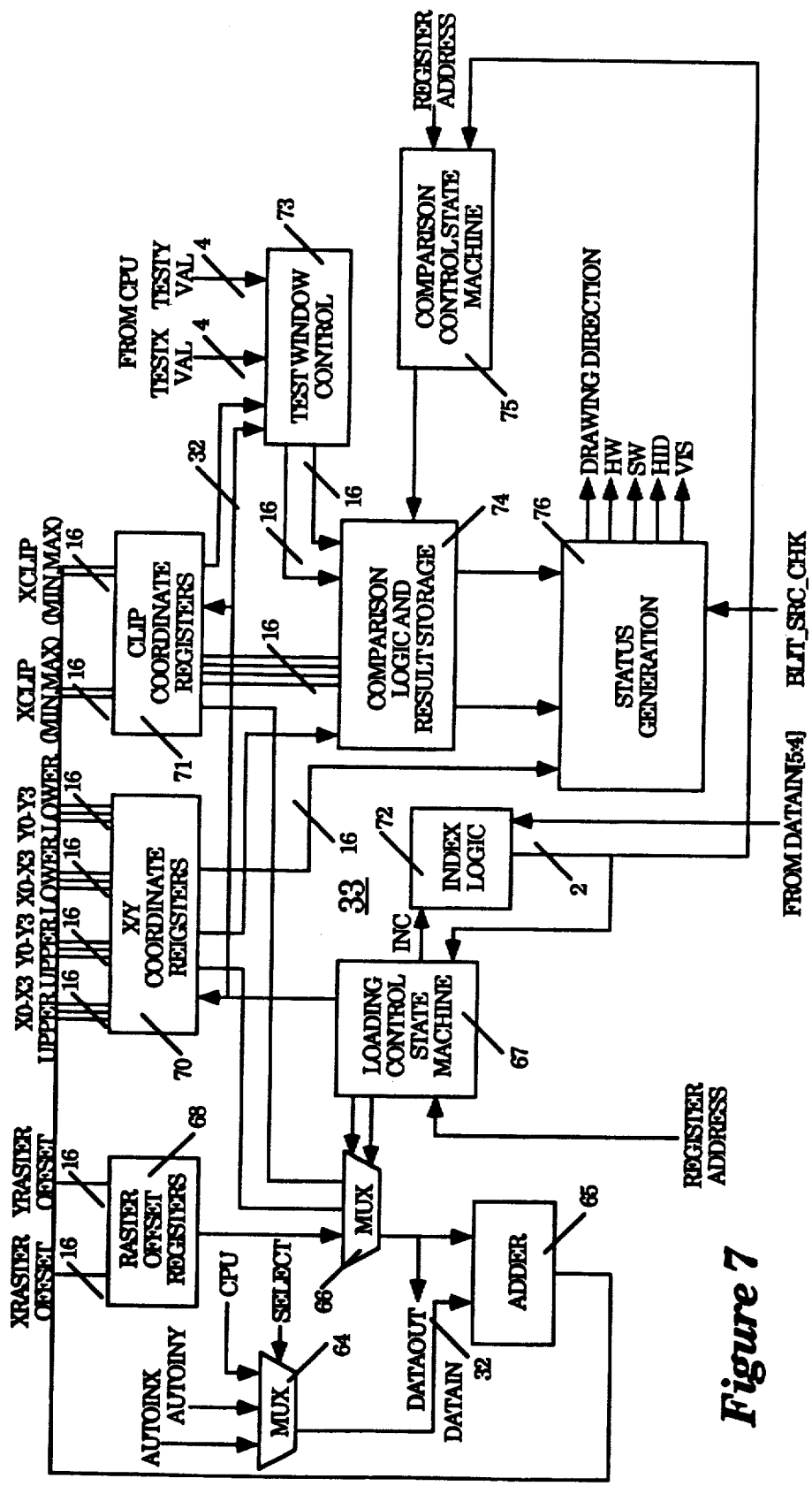
FIG. 7 is a block diagram illustrating a coordinate staging unit which may be used in the present invention.

The coordinate staging unit 33 is illustrated in FIG. 7. Input to the coordinate staging unit 33 is provided through a multiplexor 64 which receives absolute value inputs from the central processing unit or inputs used to automatically increment values previously stored by a selected amount where a particular font width and stride is to be repeated across the output display, for example. The provision of auto indexing values, which may be furnished by the central processing unit and stored in registers (not shown), allows the system to generate new values without referring to the central processing unit and assists in speeding the operation of the graphics accelerator of the present invention.

In response to the chosen operation, a received coordinate or clip boundary address value is passed from the multiplexor 64 on a data-in line to an adder 65 which may be utilized for various purposes including adding the auto increment values to values previously stored as vertices at the stage 33. A multiplexor 66 controls the furnishing of additional inputs to the adder 65. The control of the multiplexor 66 is accomplished by loading control state machine 67 which provides the various signals for assuring that the operation is accomplished appropriately. The state machines 67 and 75 control the operation of the adder 65, a raster offset register 68, X/Y coordinate registers 70, clip coordinate registers 71, a test window control 73, and comparison logic and result storage unit 74 to coordinate their operations so that all of these functional blocks operate to provide data in an appropriate pipeline arrangement.

Although the coordinate staging unit 33 is well described in the copending patent application, those elements which are especially pertinent to the accelerated operation of the present invention will be described in brief at this point. As pointed out, the coordinate staging unit 33 includes a number of coordinate registers 70. These are used for holding the addresses of the X and Y values of each of four vertices of a quadrilateral to be drawn. In drawing a quadrilateral, the four vertices of the particular quadrilateral to be drawn are stored in these registers and referenced as vertex numbers zero through three. In quadrilaterals handled by the system, vertex zero is connected to vertex one, vertex one is connected to vertex two, vertex two is connected to vertex three, and vertex three is connected to vertex zero; no connections are made between vertices zero and two or vertices one and three. The plurality of X/Y coordinate registers 70 receive the X and Y coordinate values of the vertices of any quadrilateral to be drawn by the graphics accelerated 20, and the clip coordinate registers 71 receive the maximum and minimum X and Y values of the clip window within which a particular figure is to be drawn.

The coordinate staging unit 33 forms the initial stages of a pipeline that eventually accomplishes the rendering of a specified quadrilateral into the frame buffer 13. The subsequent pipeline stages require information concerning the relationship of each adjacent vertex of a quadrilateral to be drawn to its neighboring vertices. Also necessary in the subsequent stages are comparisons of each of the vertices to the boundaries of any window in which the quadrilateral is to be drawn so that clipping may be accomplished in hardware. For this purpose, the clip coordinate register 71 furnishes the values of the X clipping minimum and maximum points and the Y clipping minimum and maximum points to the comparison logic and result storage circuitry 74 so that the various comparisons necessary may be made.

The comparison logic and result storage circuit 74 takes these values and provides within the input band width of the bus interface logic 31 comparisons between each of the individual vertices of a quadrilateral and all of the other vertices of the quadrilateral as well as between each of the individual vertices of the quadrilateral and the clip window boundaries. Thus, at the output of the coordinate staging unit 33 are provided outputs indicating the result of the comparison of each X value of each X vertex to each other X value of each of the other vertices, the comparison of each Y value of each vertex to each other Y value of each of the other vertices, and the comparison of each of these X and Y values of the vertices to the edges of the clip window in which the information is to be presented.

After all coordinate and clipping registers have been loaded, the central processing unit can provide a signal indicating to the comparison logic 74 the particular operation to be performed. If a status signal generated by the comparison logic 74 through status generator 76 indicates that the operation may be accomplished by the graphics accelerator 20, the operation begins immediately. To accomplish this, the status generation circutry 76 includes a draw status register and a block move status register. The arrangement which allows this immediate operation substantially increases the speed of operation of the graphics accelerator by eliminating many of the steps required in an interface handshake operation; the details of this arrangement are described below. This information is presented and available within the band width of the frame buffer to the coordinate sequencing unit 35.

The use of particular registers in the coordinate staging unit 33 to which the coordinates of the vertices are directed and the status registers allows information to be acted upon without further instruction when placed in the coordinate registers. That is, the address of the status register indicates to the loading and comparison logic of state machine 67 the operations to be performed. Consequently, it is not necessary for the system to provide additional time or a command followed by the various parameters which the command is to operate upon in order for the system to begin to function. In the present invention, the parameters and the operation to be performed are provided and the status signal is read. If the status signal (HW) indicates that the operation may be carried out, then the operation is launched without any additional interaction. If the status signal (SW) indicates that the operation may not be carried out, as indicated by a single bit, then the central processing unit is so informed; and the information included within the status word held in the appropriate status register indicates to the central processing unit why the operation cannot be started and tells the central processing unit what operation it should carry out.

In contrast to this, the typical graphics accelerator of the prior art must to initiate any particular operation by which information is written to the computer output display at least 1) check the status of the graphics accelerator to determine whether the data registers are ready to receive data 2) write all of the data necessary to the registers of the graphics accelerator, 3) read the status register of the graphics accelerator to find out whether any exceptions exist which would make the operation impossible to accomplish, and 4) write the command to the graphics accelerator to initiate its operation. A typical write operation at a prior art computer bus interface for two pieces of data, such as an X and a Y value of a point to be displayed, requires at least five individual accesses by the central processing unit of the graphics accelerator taking a substantial amount of time.

A typical write operation may require from three to seven clock periods to accomplish the handshake required between systems for the operation. On the other hand, a typical read handshake operation in a computer bus interface system may require from five clock cycles to twelve clock cycles in order to accomplish the handshake operation. Thus, the number of read and write operations involved in the initiation of any particular operation at any computer interface limits the speed with which the particular operation can be initiated.

If the interface between the central processing unit and the graphics accelerator requires such a period of time in order to accomplish the initiation of each operation, then the interface cannot possibly transfer data at a rate sufficient to match the bandwidth of the video frame buffer. Moreover, with so many indivdual accesses involved, if the interface time to initiate any particular operation is long there are a great number of instances in which another task might run in a multitasking system before the current task can finish. This can lead to problems of stale data and excessive context save/restore overhead which further slows the operation of the system.

U.S. patent application Ser. No. 07/428,236, entitled *Apparatus and Methods for Interface Register Handshake for Controlling Devices*, Priem, Malachowsky and Rocchetti, filed Oct. 27, 1989, describes in detail methods and apparatus for reducing the number of read and write operations necessary at an interface between a central processing unit and a peripheral. Such apparatus and methods are utilized in the graphics accelerator 20 of the present invention.

Figure 15A:
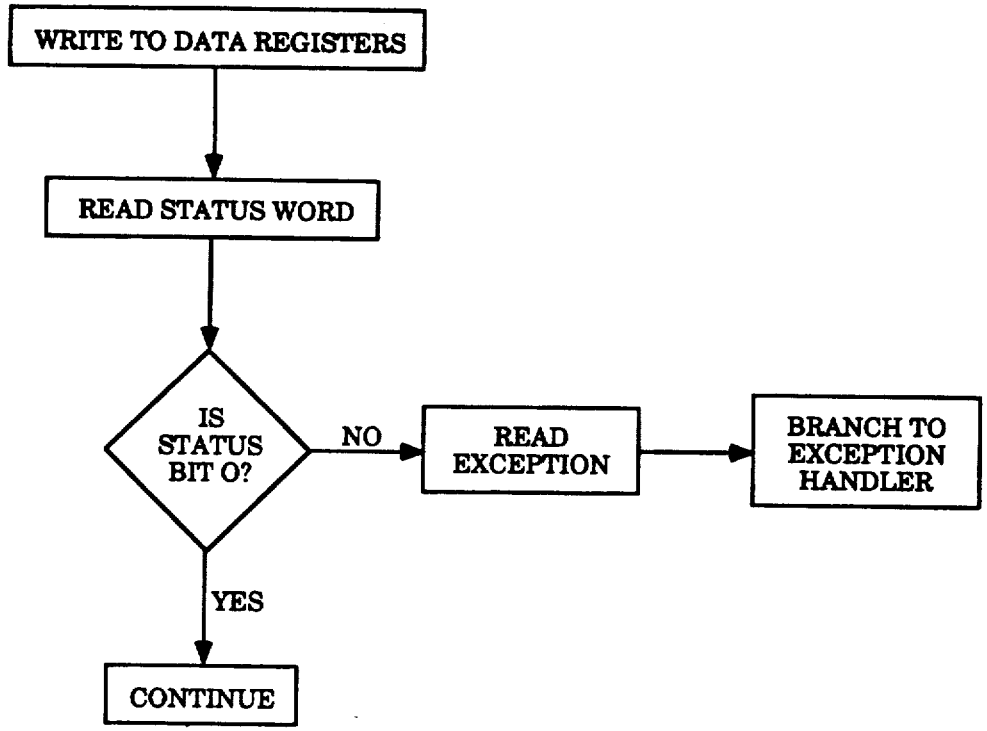
FIG. 15(a) is a flow chart illustrating a method used to reduce the time to initiate a command through the bus interface.

The method utilized for reducing the time necessary to initiate any operation is illustrated in the flow chart of FIG. 15(a). This method eliminates the first read operation required by the central processor in order to determine whether the registers of the graphics accelerator are able to receive the new data to be written. In order to accomplish this, an assumption is made that the graphics accelerator is, as a default, able to accept data transferred to it and that any data transferred will be utilized by the graphics accelerator. Thus, the first step of the prior art method in which it is determined whether the registers of the graphics accelerator are full is eliminated and the system instead writes the data to those registers presuming they are empty. Two concomitants exist from the assumption that the registers of the graphics accelerators are not full. First, the central processor must wait for the graphics accelerator to be in a condition where its registers are ready to accept more data (not full) in order for the optimization to operate correctly. Second, once the command has been written to the graphics accelerator by the processor, the command must be completed by the graphics accelerator so that its registers are not full and are ready to accept the next data to be written. Once a command is initiated the data is copied to an internal set of registers so that the data registers are ready to accept the next data. In the system of this invention, a number of pipelined register stages are available for this purpose.

The next step after writing the data to the registers (step 2) is to read the status of the graphics accelector to make sure that the object can be drawn (that no exception exists) and that the data registers are ready to accept the next data. This requires one read access of a determinable period of time.

As pointed out, the graphics accelerator also eliminates the step which requires that the command itself be written after the data is loaded in the data registers and the status has been determined. If the status register is read and there is no exception, then the commmand is executed automatically. The graphics accelerator includes individual status registers for the draw operation and for the block move operation. Consequently, when one of these status registers is addressed and no exception exists, the next (command) step is known simply from the address of the status register which has been read; and the command may be executed without a separate command being written.

The steps required to initate a supported operation are thus first to write the data to the data registers of the graphics accelerator, then to read the status of the graphics accelerator by reading the status register. If there is no exception, then the command is executed. If there is an exception then the command is not executed. However, this latter situation is the same situation that the system would be in were it to have used the prior art method for initiating each operation. Consequently, the lack of the step of writing the command to the graphics accelerator does not lengthen the time to accomplish a system operation when an exception occurs.

The method of launching a command also varies the usual method of checking the status register from that typically found in the prior art. Normally a status register would include a number of bits which are set to indicate individual exceptions. For example, the drawing unit 30 does not handle operations which lie outside a particular test window area, does not handle the drawing of at least one form of quadrilateral, refers transformation overflows or underflows to the associated processor for solution, refers divide-by-zero operations from its transformation unit to the associated processor, and does not handle operations when its pipelines are full. Normally, each of these exceptions is indicated by its own individual bits in the status register.

The usual operation required to read the status register of a prior art graphics accelerator requires reading all of these exception bits, loading a mask to determine a particular exception, ANDing together the bits of the mask and those in the status register to select the bits to be utilized, comparing the bits to be utilized, and, finally branching to the particular operation to be carried out in response to the exception.

Figure 15B:
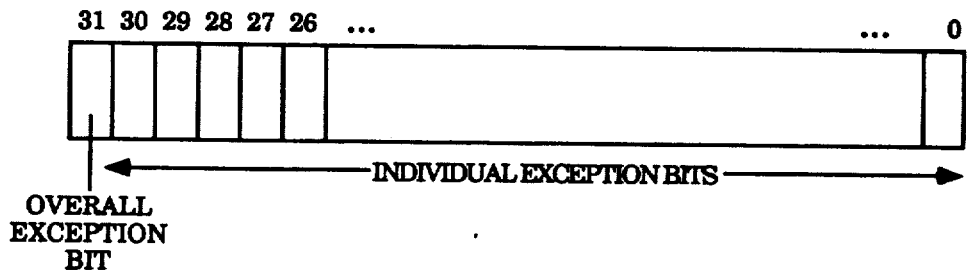
FIG. 15(b) illustrates a status register used in the coordinate staging unit of the present invention.

In contrast to such prior art arrangements, the status registers of the present invention (shown in FIG. 15(b) includes, in addition to exception bits for each of the individual exceptions, an overall exception bit held in the high order bit 31 of each status register. The graphics accelerator ORs each of the individual exception bits in each of the exception bit positions other than bit 31 and provides a one at bit 31 if any one or more exceptions exist. Consequently, a one in bit position 31 of the status register indicates that an exception exists. A zero in the bit position 31 of the status register, on the other hand, indicates that no exception exists and the operation may proceed without further checking.

Consequently, all that is necessary for the read access of the status register utilizing the present invention is to read the status word, test bit 31 and if a zero is present indicating the status is positive, branch (branch on greater than or equal to zero) to the next operation to be accomplished. This substantially reduces the time required for processing the particular read access. If, on the other hand, a one exists in the status bit 31 indicating the status is negative, the entire status word has been read by the processor; and that status word need not be read again for the exception which exists. By simply sampling the particular bits of the status word, the processor utilizing the graphics accelerator is able to determine which exception exists and how to branch in response to that exception.

Such an arrangement reduces the time required to start the opertion, reduces the problem of stale information caused by interrupts, and allows the particular process to be reinitiated when interrupted by simply rewriting the registers of the coordinate staging unit 33 and checking the status word.

The coordinate staging unit 33 also includes a test window control circuit 73 which receives from the central processing unit relative values of an offset from the maximum and minimum values of the X edges of the clip window and a relative offset for the Y minimum and maximum values of the clip window. These values are also furnished to the comparison logic and result storage circuitry 74. The test window control 73, in effect, provides a window surrounding the clipping window into which information is to be written on the screen.

The provision of this test window allows a decision to be made as to whether a particular operation should be accomplished in hardware or returned to the central processing unit for implementation in software. For example, if a particular image to be drawn lies almost wholly outside the clip window and the manner in which the system operates would normally require the system to step through a large number of pixels and scan lines which need not be drawn at all, then it may be faster to return the particular clipping operation to the central processing unit. In such a situation, the circuit 73 provides an exception bit to one of the bit positions of the status registers. On the other hand, if the entire image to be clipped lies close to the window in which the drawing is to be rendered, then actually stepping through the various clipped pixels in the rendering hardware of the graphics accelerator 30 may be faster than accomplishing that process in software using the central processing unit. It is for this reason that a test window is provided. The test window may be superimposed about the window in which rendering is to be done so that an area in which faster clips are done by hardware is effectively enclosed within the test window while operations which should be accomplished by software lie outside the test window.

In any case, the values of the vertices of a quadrilateral are provided to the comparison logic and result storage 74 from the X/Y coordinate registers 70 along with the values of the clip window from the clip coordinate register 71 and the test window values from the test window control 73. The comparison logic and result storage 74 accomplishes the comparison of each X value of each vetex to each X value of each other vertex, the Y value of each vertex to each Y value of each other vertex, the X value of each vertex to each of the Xmin and Xmax clip values, the Y value of each vertex to each of the Ymin and Ymax values of the clip window, and the X values of each vertex to the minimum and maximum X values of the test window surrounding the clip window along with the Y values of each vertex to the mimimum and maximum Y values of the test window surrounding the clip window. This comparison is accomplished by the comparison logic and result storage 74 under control of a comparison control state machine 75.

The comparison control state machine 75 directs the operation of the comparison logic and result storage unit 74 to accomplish the appropriate comparisons necessary for the particular operation being carried out by the coordinate staging unit 33. It also cooperates with the loading control state machine 67 to provide the appropriate sequencing of signals so that different operations of the coordinate staging unit 33 are accomplished such as the address auto increment, absolute and indexed addressing, relative addressing, and offset addressing. Again, the details of these operations are well described in the copending application and will not be treated here.

It will be noted, however, that all of these comparisons are available immediately for use by the remaining units of the graphics accelerator of this invention and are stored for that purpose in the comparison logic and result storage 74. It should also be noted that the information derived from the comparison is furnished to status generation unit 76 which generates the various control signals by which the operation of the graphics accelerator of this invention precedes. For example, the status generation unit 76 having compared the figure to be drawn to the coordinates of the clip window and the test window generates a signal indicating the drawing direction to be taken by the circuitry in describing any particular figure so that the figure may be drawn most rapidly in a manner described at other parts of this specification. The status generation unit 76 also uses the status registers to generate the signals which describe whether a particular process should be accomplished in hardware (HW) or software (SW). The unit 76 also generates a signal describing whether the object to be drawn is hidden (HID) outside the active clip window or visible (VIS). All of these signals are provided for use by the subsequent stages of the graphics accelerator pipe line.

The coordinate staging unit 33 includes an index loading mechanism 72 which utilizes a two bit index to guide and identify how many and which coordinate registers 70 are to be loaded during any given cycle. This mechanism allows the central processing unit to specify that a quadrilateral, triangle, line, or point is to be drawn so that the unit 33 may be rapidly loaded and for other purposes described in that patent application.

As described in the copending patent application, the preferred embodiment of the coordinate staging unit 33 utilizes a two clock cycle coordinate loading stage followed by a two clock cycle comparison stage. These two stages can be pipelined so that the overall latency is three clock cycles with new input receivable or new results available every other clock cycle. Thus, the coordinate staging unit 33 is capable of operation with a two clock cycle throughput thereby maintaining the desired input bandwidth for the frame buffer.

The Coordinate Sequencing Unit

Figure 8:
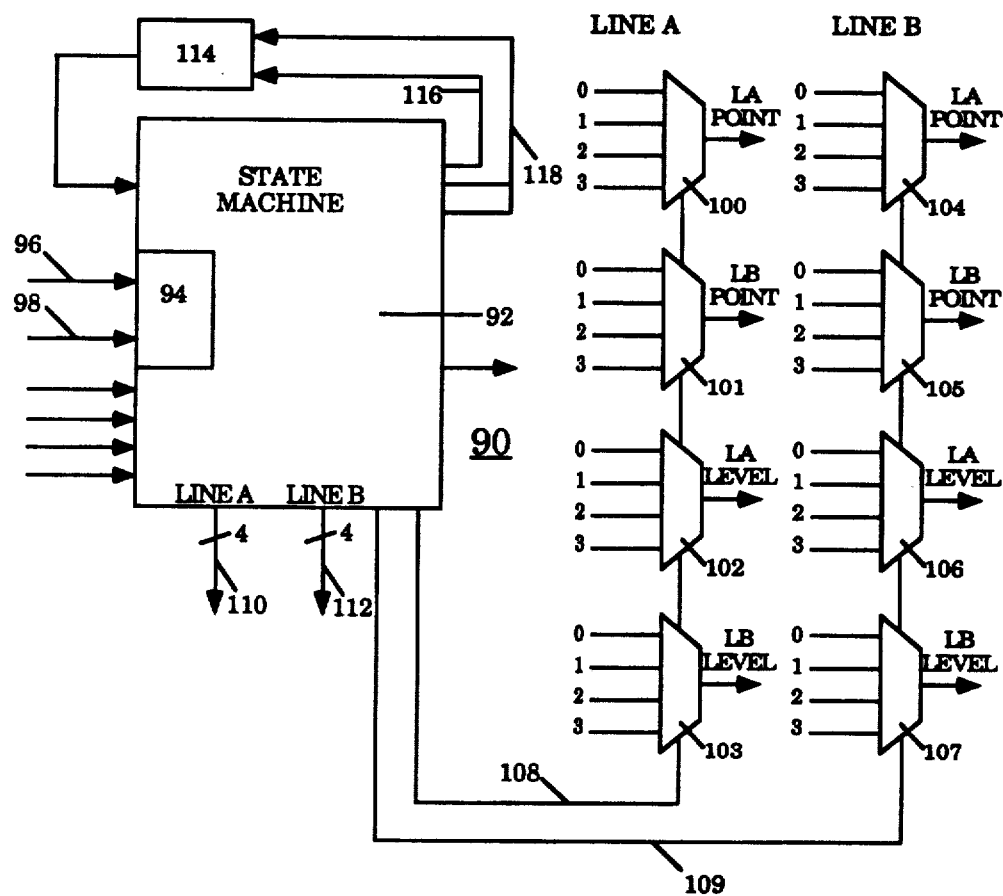
FIG. 8 is a block diagram illustrating a coordinate sequencing unit which may be used in the present invention.

The coordinate sequencing unit 35 of the drawing unit 30 of this invention includes circuitry which is described in detail in a co-pending application Ser. No. 07/287,128, *Method and Apparatus for Decomposing a Quadrilateral Figure for Display and Manipulation by a Computer System*, Malachowsky, filed Dec. 20, 1988. This portion of the graphics accelerator is shown in FIG. 8. It utilizes the comparisons between vertices of a quadrilateral made by the coordinate staging unit 33 to break the quadrilateral into subportions. These subportions are bounded by pairs of line segments which subtend a trapezoidal area made up of scan lines to be presented on the output display. The coordinates of these line segments are provided as output by the coordinate sequencing unit 35. The X and Y coordinates of the two ends of each scan line in each trapezoid may be determined using these line segments.

The circuitry for decomposing the quadrilateral graphical figures into trapezoidal subportions bounded by two line segments and including the area therebetween having the same Y values is described in the above-mentioned patent application. As pointed out, FIGS. 5(a-d) illustrate an original quadrilateral and the subportions in which that quadrilateral may be broken in order to facilitate the rapid processing of and display of quadrilaterals on an output display. It will be noticed in FIGS. 5(a-d) that in each subportion, the area defined is a trapezoid or degenerate trapezoid made up of the parallel Y scan lines drawn to join the two line segments. The scan lines are ultimately conveniently and rapidly scanned into the frame buffer by the graphics accelerator of this invention.

The circuit of the coordinate sequencing unit 35 for decomposing the quadrilaterals provides for extremely rapid input to the frame buffer. It utilizes a hardware implementation of a four-by-four matrix which employs the four Y values of the vertices of each quadrilateral and the comparisons of the values of those vertices provided by the coordinate staging unit described above to provide instantaneous readouts of the coordinates of the ends of the line segments defining the decomposed subportions so that they may be processed and written to the frame buffer.

The implementation requires of the hardware matrix only Y element comparisons and handles all imaginable quadrilaterals with but a single exception which must be implemented in software by the central processing unit. It optimizes the method by which the line segments connecting the vertices of the quadrilaterals are decomposed to form the minimum set of aligned trapezoids. The system is devised to select the optimum manner of decomposing a shape so that the operation precedes at its most rapid rate. For example, if a shape to be decomposed lies only partially within a clip window and either partially above or below the clip window, the operation will procede more rapidly if the portion outside the clip window need not be processed. This may be accomplished if the decomposition of the quadrilateral may proceed from either the top down or the bottom up, whichever direction leads from the visible to the clipped.

The decomposition provided by the circuitry of the coordinate sequencing unit 35 takes place either from the top down or from the bottom up depending on the signals received from the status generation unit 76 shown in FIG. 7. The coordinate sequencing unit 35 may be utilized to draw graphical representation from up to down or in reverse, thereby substantially speeding the operation of the graphics accelerator. The operation of the circuitry is independent of the order in which the vertices are entered and handles repeated vertices and other degenerate cases of quadrilaterals so that points, lines, triangles and quadrilaterals are all handled in the same manner and, essentially, at the same speed. In contrast to the clipping required by graphics accelerators of the prior art and by central processing units utilizing software which must compare each line comprising a side of a quadrilateral figure to each side of the clip window in a serial fashion, before rendering that figure on the computer output display, the clipping provided by the graphics accelerator of the present invention is inordinately fast. This speed is, in part, obtained by simply not rendering the portion of the figure which does not lie within the clip window, a direct result of the coordinate sequencing unit 35 being able to decompose images in either an upward or a downward direction.

Referring again to FIG. 5, there is shown a quadrilateral shape defined by its four vertices and straight lines connecting those vertices which will be used to explain the operation of the circuit of FIG. 8. For the purposes of this invention, the quadrilateral is defined to have vertices x0y0, x1y1, x2y2, and x3y3. The quadrilateral shape is particularly determined by connecting x0y0 (vertex 0) to x1y1 (vertex 1) to x2y2 (vertex 2) to x3y3 (vertex 3) to x0y0.

Figure 9:
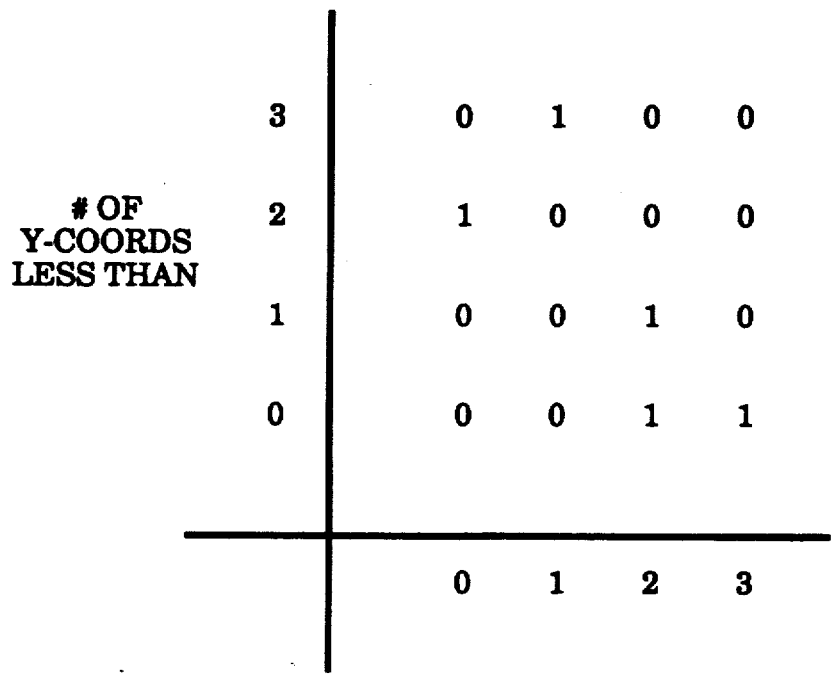
FIG. 9 illustrates a matrix which is implemented in the circuitry illustrated in FIG. 8.

A single four-by-four matrix is presented in FIG. 9 to explain the method by which the quadrilateral shape is decomposed rapidly by the graphics system of this invention. The matrices are actually implemented in the hardware of FIG. 8 as will be explained hereafter. The base of the matrix in FIG.9 has its columns labelled to indicate the particular vertices of the quadrilateral being defined; column 1 handles information for vertex 1 and so on. Along the left side of the matrix are placed row indications for each vertex. For each vertex, a one is placed in the column for that vertex at the row which indicates the "level" of the vertex. Level as here used is particularly defined to indicate for each vertex the number of other vertices in the particular quadrilateral which have Y values below (or less than) the particular vertex.

For example, in FIG. 5, vertex 3 is the lowest vertex and consequently has no other vertices below it. Thus a "one" is placed in row zero of the matrix to indicate the level of this vertex. Vertex 2 has only vertex 3 below it, so a "one" is placed in the matrix at row 1 for vertex 2 to indicate that a single vertex is below it in the quadrilateral shape. In like manner, vertex 0 has two vertices (vertex 2 and vertex 3) below it, so a "one" is written in the matrix at row 2 to indicate level two for vertex 0. Finally, vertex 1 has three vertices below it in the quadrilateral shape, so a "one" is written in the matrix at row 3 to indicate level 3 for vertex 1.

It should be understood that in implementing the matrix in accordance with the invention, a number of rules are followed. For example, each vertex has its own column, and each column may have only a single "one" in it. As will be understood, in order to deal with the matrix for the understanding of the reader of this specification, the columns are considered to repeat to the right and left of the four columns shown in FIG. 9 in the same order, i.e. 0123,0123,0123. To understand the use of the matrix, the following terms are also used. For each line segment processed, one vertex is called the starting vertex and the other is called the ending vertex. The "current level" is the level of the starting vertex of a line segment. "Ahead" means in the direction of entry to the matrix, and "behind" means in the opposite direction of entry to the matrix. In utilizing the matrix, two lines which make up the selected portion of the quadrilateral which is to be decomposed are considered at the same time. The first line is referred to as line "A" and the second as line "B".

Considering the matrix for the quadrilateral of FIG. 9, the matrix is entered from the left in the row which is at the lowest level. The determination of the vertices of what will be the line A begins at that vertex and continues to the right by looking ahead to determine if the vertex in the column ahead lies at a level above the entry vertex. If so, this vertex ahead is selected as the end vertex of the line A. If not, then the determination requires a look behind (to the left) to determine if the vertex in the column behind lies at a level above the entry vertex. If neither of these conditions is true, then the rules require first a look at the column ahead at the same level. If this condition is not true (i.e., no "one" in the column), then the end vertex is set to the column behind. In FIG. 5, the entry vertex is vertex 3, and the vertex ahead is vertex 0 which is at a level 2. Thus, the first line segment to be handled is the line running from vertex 3 to vertex 0.

The second or B line is determined by essentially the same rules. By coincidence, the same vertex is used as the starting point for the second line, but the tests are applied in the opposite direction, i.e., the entry is from the right, the first look ahead is to the left and above, then behind to the right and above, then ahead at the same level, and finally (if none of the forgoing are true) the vertex behind is designated the end vertex of the B line. Thus using the matrix gives the end vertex as vertex 2.

It will be seen from FIG. 5 that the two line segments connecting vertex 3 with vertices 0 and 2 both contain the same Y values from vertex 3 all the way up to vertex 2. Thus, the points on the two line segments define a (degenerate) trapezoid. However, a portion of the line segment connecting the vertices 0 and 3 is not included within this trapezoid. This line segment is, therefore, used again in determining the next pair of line segments. The rule for this selection is to reuse a line segment if its ending vertex level is higher than the ending vertex of the other line segment in the pair. The other line segment (the B line for this pair) starts with the ending vertex of the line previously used but not repeated. The same rules as to application of the matrix to determine the ending vertices of the line segments pertain, so for FIG. 9, the B line of the second pair starts at vertex 2 where a "one" appears at level 1 of the matrix. Looking ahead to the left shows a "one" above level 1 for vertex 1 at level 3, so the line joining vertices 2 and 1 is entered as line B of the second line segment pair which includes the line joining vertices 0 and 3 as the A line segment of the pair. It will be seen that this second pair of lines also includes a number of scan lines at the same Y levels falling between the vertices 2 and 0 and defining a second trapezoidal area.

Finally, the line segment joining the vertices 1 and 2 is reloaded and used as line segment B for the last pair since it has an ending vertex level above the ending vertex level of the line segment joining the vertices 3 and 0. The ending vertex 0 of the A line segment which is not reloaded is used as the starting vertex for the A line segment of the last pair. Looking first ahead from the 2 level of the "one" in the vertex 0 column shows a "one" in the column for vertex 1 and defines the A line segment as the line connecting vertices 0 and 1. This completes the last pair of line segments, and obviously includes all of the remaining scan lines at Y levels within the quadrilateral of FIG. 5. The rule for completing the list of line segments requires that the search end if both line segments have terminated at the same level and no higher level exists within the matrix with a "one" in it.

Although, the description of the application of these rules appears to occur sequentially, all of these delineations can be and are in the preferred embodiment of the invention made combinatorially, all in parallel, and all at once.

As pointed out, it is important to the speed of operation of the graphics accelerator of this invention that the arrangement be able to handle graphical shapes from the top down or from the bottom up. The capability of the coordinate sequencing unit 35 to operate in either an up or a down direction may be demonstrated by simply traversing the matrix of one of the examples given above starting in row 3 and moving toward row 0. The line segments identified in this manner are the same as previously identified and illustrate the ability of the invention to operate in either direction.

Referring now to FIG. 8, the schematic block diagram includes the circuitry for implementing the matrix which has been discussed with respect to FIG. 9. FIG. 8 illustrates a circuit 90 which is utilized for this purpose. The circuit 90 includes a state machine 92 which controls the entire operation of the decomposing circuitry. The state machine 92 includes a portion 94 which receives inputs indicating how the various vertices of the particular quadrilateral of interest compare to one another. These inputs are provided on input lines 96 and 98 each of which carry twelve bits of information in the preferred embodiment and indicate, respectively, X and Y coordinate comparisons. As explained above with respect to FIG. 7, these are provided as outputs of the coordinate staging unit 33.

The state machine 92 provides the signals by which the starting vertex and the ending vertex referred to above with respect to FIG. 9 are handled. Portion 94 of the state machine 92 provides as outputs, on thirty-six different lines, signals each of which indicate the number of one vertex of the quadrilateral of interest and signals which indicate the level value for each vertex. The signals indicating a vertex number are two bit signals in the preferred embodiment. The signals that identify the starting vertex for lines A and B are provided to the multiplexers 100, 101, 102, and 103 for the line segment A and to the multiplexers 104, 105, 106, and 107 for the line segment B on data select control lines 108 and 109, respectively. Multiplexers 100 and 104 are "look ahead" (LA) multiplexers, and as such indicate the column to which the entry column refers as a look ahead column. Thus, a signal for each column is provided at the input to the multiplexer 100 on the input terminals indicated 0 through 3 (which indicate the entry column). This two bit signal indicates which column is the "look ahead" column for the input column used as an entry column. Since the look ahead column is always the column to the right of the A line segment entry column, the signal provided at the data terminals for a column 0 selection indicates column 1 as the look ahead column and so on, with the signal to column 3 indicating column 0 as the look ahead column. Multiplexer 104 operates in a similar manner except that the "look ahead" column for the B line segment is the column to the left; consequently, the signal on the line for a column 1 selection, for example, indicates the 0 column.

The data inputs to the indicated columns 0 through 3 for the multiplexers 101 and 105, on the other hand, indicate the "look behind" (LB) column for the particular column. Thus, the two bit signal on the column 0 input to multiplexer 101 indicates column 3 is the look behind column, and the signal on the column 3 input indicates that column 2 is the look behind column. Multiplexer 105 operates in a similar manner, but the signal on each column line indicates the column which is one number larger, the "look behind" column for the B line segment.

Two additional multiplexers 102 and 103 are provided for the A line segment, and another two additional multiplexers 106 and 107 for the B line segment. Again, each of these multiplexers has input data lines representing each of the columns 0-3 of the matrix being implemented by the circuitry 90. These input lines carry two bit signals from the circuitry 94 indicating the Y level of each of the columns. For example, using the quadrilateral of FIGS. 5 and 9, line 0 of the look ahead level multiplexer 102 would carry a signal indicating level three because the vertex 1 of column 1, the look ahead column for column 0, has three vertices below it. In like manner, the look ahead level for line 1 of multiplexer 102 carries a signal indicating level one because the vertex of column 2 is at a level with but a single vertex below it. The multiplexer 106 operates in a similar manner (looking to the left, however) to provide look ahead levels indicative of each of the columns for line segment B. In a similar manner, the multiplexers 103 and 107 provide signals indicative of the levels of the vertices at the "look behind" columns for each of the input lines representing the different columns.

The multiplexers are activated by signals provided on the data select control lines 108 and 109 from the state machine 92 which indicates that either the line segment A or the line segment B is to be defined. Thus, a signal on the line 108 indicating the selected entry column for line A activates the multiplexers 100, 101, 102, and 103 and provides an output signal indicating information describing the look ahead column for the particular entry column, the level of that signal, the look behind column for that entry column and the level of that signal. Thus, if the quadrilateral shape of FIGS. 5 and 9 is being decomposed, the entry is at column 3; this entry column signal on the line 108 causes the multiplexers to provide outputs indicating a look ahead column of column 0 with a vertex at level two and a look behind column of column two with a vertex at level one. The information regarding the two vertices that make up the initial A line segment are provided as a four bit output in the preferred embodiment at terminal 110 for transfer to the functional addressing stage 36 shown in FIG. 4 for further manipulation by the system.

In like manner, to determine the initial B line segment for the quadrilateral of FIG. 5, a signal is provided on line 109 indicating the entry column for line segment B. This causes the multiplexers 104, 105, 106, and 107 to provide output signals indicating the look ahead and look behind columns and the levels of the vertices at each look ahead and look behind column. The information regarding the two vertices that make up the initial B line segment are provided as a four bit output in the preferred embodiment at terminal 112 for transfer to the functional addressing stage 36 shown in FIG. 4 for further manipulation by the system.

The state machine 92 also includes output lines for providing signals to a comparator 114 which indicate that the operation of decomposition for the particular quadrilateral has been completed. The line 116 provides an indication of the highest level for any of the vertices of the quadrilateral as determined from the X and Y input comparison signals. This is used by the comparator 114 and matched with signals on the line 118 which indicate the level of each of the end vertices of the line segments A and B. When the line segments end on equal Y vertices and there are no other levels of vertices above in the quadrilateral, the comparator 114 furnishes a signal to the state machine 92 indicating that the quadrilateral has been decomposed and the particular operation is complete.

It should be noted that the decomposition of the quadrilateral provided by the circuit illustrated in FIG. 8 takes place and all values are available as soon as the values furnished by the comparisons of the particular vertices are available from coordinate staging unit 33. This is to be contrasted to the time consuming sequential software method which would otherwise be necessary for determining the vertices of such trapezoids. In particular arrangements, of course, where the system includes other delays which do not require such rapid operation, totally combinatorial logical may not be necessary; and pipelined stages may be sufficient to identify a trapezoidal figure as fast as other circuitry is capable of accepting data.

Functional Addressing Stage: Circuitry for Determining X Values On Each Scan Line After the individual quadrilaterals have been decomposed into subportions at the coordinate sequencing unit 35, the individual Y scan lines running between the aligned segments have their beginning and ending X values determined at a functional addressing stage 36. This is accomplished by circuitry within this stage which determines the particular pixels constituting the X values at the beginning and the end of each scan line within the decomposed subportions of the quadrilateral and accomplishes a portion of the clipping necessary to fit the particular quadrilaterals to the clip window. Such an arrangement is described in detail in copending U.S. patent application Ser. No. 07/287,392, entitled *Method and Apparatus for Sorting Line Segments for Display and Manipulation by a Computer System*, Malachowsky and Priem, filed Dec. 20, 1988.

Figure 10:
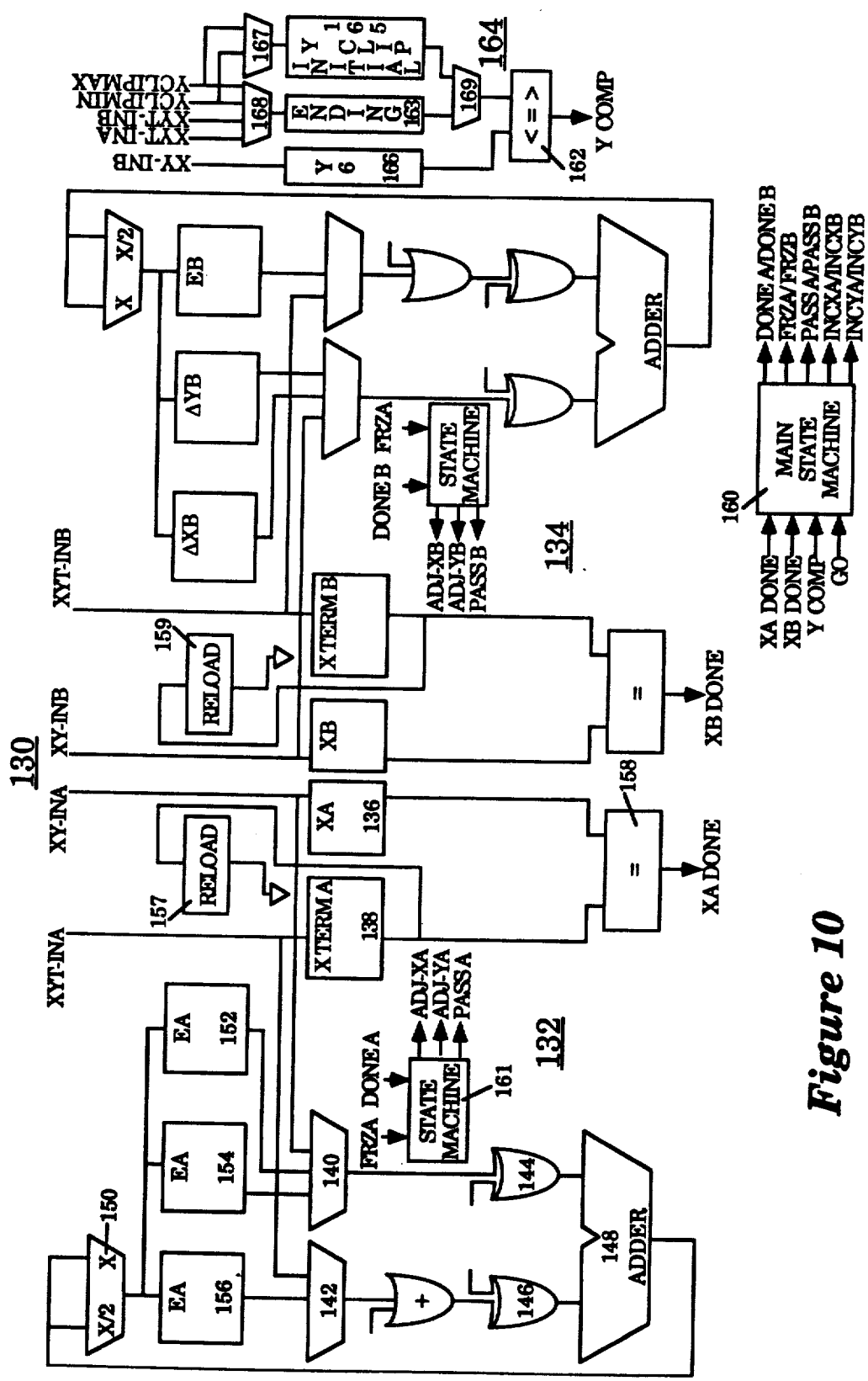
FIG. 10 is a block diagram illustrating a portion of a functional addressing stage which may be used in the present invention.

The circuitry of the functional addressing stage 36, illustrated in FIG. 10, receives from the coordinate sequencing unit 35 input signals representing the vertices of the pairs of line segments which subtend a series of common horizontal lines to be displayed at the output display of the computer system. These signals are furnished to the circuitry of stage 36 as rectilinear coordinates of the vertices of the line segments subtending the particular trapezoidal area having common Y values. Since the line position information furnished to the circuitry of the functional addressing stage includes only vertices of the line segments defining the particular subportions of the quadrilateral while the output display handles information on a scan line basis, it is necessary to determine the end points of each of the horizontal Y scan lines subtended by the line segments so that the scan lines may be presented to the output display to complete the quadrilateral of interest. If the beginning and ending X values of each series of adjacent pixels on each scan line are known, then the intervening pixels may be filled on the display and the line completed. Thus, it is necessary to know the position on each scan line of each of the line segments which define the sides of the trapezoids to be scanned to the display in order to draw these trapezoids. This is true in order to begin and end each scan line and to clip the scan lines to fit a clip window. Moreover, if clipping occurs across a line segment, a method must be devised for determining the portion of each line segment which is to be drawn. The philosophy of the circuitry of the functional addressing stage 36 is to determine those beginning and end points on each scan line and to do so in parallel between both line segments and the clip boundaries.

The circuitry of the functional addressing stage 36 includes two similar portions so that it may handle each of the two line segments defining a subportion of a quadrilateral at the same time. In one example of its operation, each portion of the circuitry begins initially at one vertex of a line segment, computes the slope of that line segment, determines from this computation whether the X or the Y value of the segment increases at a greater rate, determines and stores an initial error value which is to be decremented based on the slope, and begins plotting values from a first vertex. If the value of X changes faster than Y, then with each step, X is incremented (or decremented) by one pixel while the change in Y is subtracted from the error value until the error value reaches zero or less. In this manner, the X value at which the Y value is to be incremented (or decremented) is determined. This X value is stored as the end X value of a particular line segment, and the Y value is incremented (or decremented). The X value first encountered at the new Y value is stored as the beginning X value for the new scan line associated with the new Y value. The operation continues in this manner, storing for each Y value the first and last X values encountered, until the end vertex for the line segment is reached.

Since two circuits are operating in the same manner to process the two line segments of each subportion of a quadrilateral at the same time, the portion of the circuitry handling the first line segment ready to change its Y level, when ready to do so, waits for the circuit handling the other line segment to reach the point of change in its Y value. When this occurs, the X values for a complete scan line have been defined and may be processed; consequently, both circuits advance to the next Y value at the same time. The processing of the two beginning and two ending X values identified for each scan line involves determining the left most (minimum) and the right most (maximum) of the stored X values to be delivered to the following circuitry.

In order to rapidly process each quadrilateral, when the end of a line segment of a subportion is reached, the circuitry loads the next line segment to be processed. It is often the case that one line segment terminates before the other. In such a case, the non-terminating line segment information need not be reloaded; and substantial time is saved.

The circuitry continues processing the line segments of the quadrilateral until the figure is completed. At each step, the values generated are passed to circuitry for sorting the values to determine the actual beginning and ending values of the scan lines in view of the direction of operation of the circuitry and the application of the clip window information.

As explained above, the circuitry of the functional addressing stage also applies certain of the clip values to the quadrilateral being processed so that it may be automatically clipped without the necessity of applying a sequential clipping algorithm such as the Sutherland-Hodgeman algorithm. This is accomplished by maintaining the Y clip minimum and maximum values in registers and comparing those values to the scan line values as the information is processed. This allows the system to both ignore information which is outside a clip window and to terminate its processing when a boundary of a clip window is exceeded.

FIG. 10 illustrates a circuit 130 which is a preferred embodiment for implementing the invention. The circuit 130 includes a pair of essentially similar portions 132 and 134, each of which handles one of the two line segments. Only the portion 132 will be discussed because of this similarity. The two line segments are handled simultaneously in contrast to the sequential processing which would be necessary were the scan line ends for the two line segments to be carried out in software by the central processing unit. When determining the end values of scan lines, the circuitry is first initialized for each line segment. To accomplish this, on a first clock cycle, the portion 132 receives input values representing the X values of the beginning and ending of the first line segment (the A line segment referred to above). These values are stored in registers 136 and 138, respectively, and are also transferred to multiplexors 140 and 142. The X values are passed by the multiplexors 140 and 142 to exclusive OR (XOR) gates 144 and 146.

These XOR gates 144 and 146 also receive inputs (zero or one) which allow the X value to be passed through or complemented so that values may be either added or subtracted by an adder 148. If a zero is furnished the exclusive OR gate 144, for example, the value on the other input is simply passed through to the adder 148 while if a one is furnished to the gate 144, the input value is complemented so (as a binary number) it may be conveniently subtracted. In order to determine the change in the X value from beginning to termination, the difference of the X terms is computed and furnished by a multiplexor 150 to a change-in-X register 152 for storage.

On the next clock cycle, the beginning and ending Y values of the A line segment are furnished to the multiplexors 140 and 142; and, in a like manner, the change in Y is determined by the adder 148 and stored in both a change-in-Y register 154 and an error register 156.

The storage of the change-in-Y value in the error register 156 allows the determination of the major axis without the need for additional circuitry. This is accomplished by passing the values held in the registers 152 and 156 to the adder 148 while complementing one of them so that the larger of delta X or delta Y is determined. This larger value is then divided by two by shifting the value in the adder 148 right by one bit, and the result is placed in the error register 156 by the multiplexor 150. This completes the initialization of the circuitry 132.

At the same time, the circuitry 134 is receiving the beginning and ending X and Y values and completing its initialization for the other one of the two line segments to be processed, the B line. Once initialization is completed, each of the circuits 132 and 134 begins processing the line segment information for the line segment it is handling. Considering only circuit 132, the current X value for line A is maintained by register 136. The value in register 136 is tested against the termination value of X (assuming an X major axis, that is, the change in X is greater than the change in Y) stored in register 138 by a comparator 158. If the values are not equal, the multiplexers 140 and 142 transfer the error and Y change values via the exclusive OR gates 144 and 146 to the adder 148 so that the Y change is subtracted from the error. The reduced error value is stored in the error register 156, and the process continues until the error value goes to zero or less. The relation of the error to the zero value is tested by a state machine 161 which, when the test condition is satisfied, passes the present X value as the end value for this Y scan line, causes the Y value to be incremented (or decremented), and resets the error register by adding to the present error value a value equal to the value of the change in X. The actual test condition is dependent on the slope of the line and the direction of the traversal.

As outlined above, when either the circuitry 132 or the circuitry 134 reaches the point where a Y value is to change in accordance with the value of the slope of the line segment, the circuit 132 or 134 first to reach the change value signals the state machine 160 and waits for the other of the two circuits 132 or 134 until that circuit is also ready to change Y value. When this occurs, the state machine 160 provides signals for advancing each of the two circuits 132 and 134 to the next Y line. In this manner, each circuit 132 and 134 handles the same Y scan line at the same time and the values of both ends of a scan line may be passed at the same time to the circuitry which follows.

A circuit 164 is, in the meantime, handling the Y values. Circuit 164 includes a register 166 which initially receives and maintains the Y value and a multiplexer 168 which receives a number of signals including the Y termination value of each line segment and the Y clip minimum and maximum values, and selects one of the values for storage into a Y termination register 163. The values in the registers 166 and 163 are compared by a comparator 162 which is capable of determining whether one value is greater than less than, or equal to the other. This arrangement may be used to determine when a line segment has reached its termination point and also to determine when the figure lies vertically within the clip window.

Also included in the circuit 164 is a Y clip register 165 which receives input values indicating the maximum or minimum Y clip value. These values indicate the position of the upper and lower boundaries of the clip window to which the quadrilateral is to be written. The clip register 165 is furnished one of these values by a multiplexer 167 which passes either the minimum or maximum Y value of the clip window depending on the direction the information is being written to the frame buffer (information provided by the status generation unit 76). This clip value is used to determine whether or not a scan line is above, below, or inside the vertical clip window boundaries.

This information is important because there are certain cases in which a particular shape to be rendered may be clipped at both its top and bottom edges. The clipping at the beginning edge of the shape is determined by comparing the Y initial value in register 166 with the beginning clip value which is furnished to the register 165 by a multiplexer 167. If the information is being written down the screen (in an increasing Y direction), for example, the value furnished to register 165 is the clip minimum Y value; if progressing in the other direction, the clip maximum Y value is furnished to the register. A multiplexer 169 furnishes the clip value to the comparator 162. The magnitude comparator 162 then provides a signal which inhibits rendering until the Y value is within the clip window.

The value of Y placed in the register 163 is the Y value of the last line to be drawn in the trapezoid or the appropriate Y clipping boundary depending on the Y value at which the entire figure is to terminate. This value held in the register 163 is furnished by the multiplexor 169 to the comparator 162 which compares the current value of Y in the register 166 with this termination value for Y.

In the case in which the shape extends beyond the clip window, the ending Y clip value is placed in the register 163 and compared in the comparator 162 to the actual Y value. In this manner, the ending value of the portion of the shape to be rendered may be determined. This is especially useful in the present invention which is capable of writing the information to the frame buffer in either up or down order (that is, in decreasing or increasing Y direction, respectively). This allows the scan conversion of the lines to proceed such that the visible (non-clipped) information is processed first in the operation progressing toward information which will be clipped. This latter information may be disregarded thereby substantially increasing the speed of operation.

It will be appreciated that hardware clipping saves a great amount of system processing time because, rather than conducting a serial comparison of polygon sides to clip window planes, each scan line is vertically clipped as it is generated by a simple comparator arrangement in a step which takes no additional clock time. Overall, the functional addressing stage 36 of the graphics accelerator is designed to be capable of maintaining the rate of operation at the band width of the frame buffer for which the graphics accelerator is designed.

Functional Addressing Stage: Sorting Circuitry

In the usual computer system, information is presented to a frame buffer in an organized manner such that each scan line proceeds from left to right and is followed by the sequentially succeeding scan line. This is not the way in which information is presented by the circuitry of the functional addressing stage 36 of the present invention where the preceeding stages are able to process the information either from the top of the image to the bottom, from the bottom to the top. If the operation proceeds from the bottom up, fewer page boundaries in memory need to be crossed if the operation also proceeds from right to left rather than from left to right as is in the usual case in the prior art. The crossing of fewer page boundaries also allows more rapid operation. It is therefore necessary to provide some form of circuitry for arranging the information supplied by the functional addressing stage into the normal order for use by the frame buffer. This circuitry is included within the functional addressing stage 36 of the graphics accelerator of this invention. The circuitry receives the individual beginnings and endings of the scan lines, selects among them to determine the appropriate ones for presentation on the display, applies right and left clip window edges to the lines, and ultimately determines the specific scan line boundaries to be presented to the mask generation stage 37 and stored in the frame buffer for presentation by the output display.

The sorting logic of the functional addressing stage 36 includes a circuit for sorting the information provided by the previous stages of the functional addressing stage 36. The circuitry includes two portions, each of which includes a comparator circuit capable of reviewing addresses defining a pair of line segments. Each portion handles one edge of the subportions of the quadrilateral defined by the line segments to determine which position of each of those line segments on each scan line is the least or the greatest and which is within a left clip window boundary or a right clip window boundary. The result of each determination defines each scan line in an orderly manner and provides signals which may be transferred to circuitry for coordinating the actual access to the frame buffer.

A particular arrangement for accomplishing the operation of the sorting logic is disclosed in U.S. patent application Ser. No. 07/287,392, *Method and Apparatus for Sorting Line Segments for Display and Manipulation by a Computer System*, Malachowsky and Priem, filed Dec. 20, 1988.

FIGS. 11(a-d) illustrate the operation of a preferred embodiment of the sorting logic stage. The information which is presented to the circuitry includes the X values of pixels encountered on a given scan line during the processing of the two individual line segments. The individual line segments subtend the trapezoidal subportions of the quadrilaterals which are to be provided to the frame buffer. The pixels encountered for a given line segment may contain one or more pixels, one or two of which may ultimately define one or both ends of the scan line to be displayed at the output. The circuitry selects from among the clip window boundaries and the pixels encountered on each scan line which of the individual pixels is to form each end of the scan line. With two ends determined, the scan line may be drawn to join the two.

Each of the line segments to be handled by the circuitry may be increasing or decreasing in X value as the line is to be drawn on the output display as previously mentioned. The direction in which the shape is to be rendered on the output display is shown to the left of each of the shapes in FIG. 11. The circuitry handles the two line segments in four distinct ways depending on whether both line segments have increasing X values, both have decreasing X values, the first is increasing and the second decreasing, or the first is decreasing and the second increasing.

In the case shown in FIG. 11(a), the direction in which the shape is being drawn is from the bottom up. Both the line segments are increasing in X values. The lower horizontal pixels are thus presented to the circuitry first. As shown in the figure, line segment A has its pixels described by circles; line segment B has its pixels described by triangles. In this case, the circuitry is presented the pixels of both line segments with the leftmost pixel of each line segment being presented first for each line. The two leftmost pixels of each line segment are received at the same time, these are compared, and the least (leftmost) is stored as the leftmost pixel of the scan line. The algorithm proceeds until it is time to change Y. The last pixel in both line segments A and B is the rightmost of each. These are compared and the greatest is stored as the rightmost boundary. For this scan line, the leftmost pixel, the rightmost pixel, and the Y values are thus known so that the line to be scanned to the frame buffer is completely defined.

The next pixels presented are those at the next Y value. Again the first pixels received by the circuitry are the leftmost pixels of line A and line B. These are compared and the leftmost stored as the leftmost pixel of this scan line. The algorithm continues defining X values; and, in accordance with the operation of the remainder of the system, the circuitry generating the line segment values causes the generation of signals for line B to halt and wait for line A to reach the Y change stage. When line A reaches this stage, the two rightmost pixels are compared; and the rightmost pixel of the two is stored as the rightmost pixel of the scan line. Thus, this scan line is also completely defined. The operation continues in this manner until complete.

In the case illustrated in FIG. 11(b), the X values of line A are increasing and of line B are decreasing so that the first pixel presented for line A is the leftmost, while for line B, the first pixel is the rightmost. In this case, the first pixel of line A is stored as the leftmost pixel, and the first pixel of line B is stored as the rightmost pixel of the scan line. The operation proceeds until the end pixels of each of lines A and B are encountered. The rightmost pixel of the A line is compared to the rightmost boundary pixel previously stored; and the rightmost of these is stored as the rightmost boundary of the scan line. The leftmost pixel of the B line is compared to the previously stored leftmost pixel, and the least of these is stored as the leftmost boundary of the scan line. In the case shown in FIG. 11(b), the original values stored for the leftmost and rightmost pixels remain the values for the scan line.

On the next scan line, the initial pixels for lines A and B are again stored as the leftmost and rightmost pixels of the scan line, respectively. Then the algorithm proceeds to define the remaining X positions of the scan line until the last pixel on that scan line for each of lines A and B is encountered. Again, the last pixel of the A line is compared with the value stored as the rightmost pixel; and the higher value stored as the rightmost pixel. In the case shown in FIG. 11(b), the A value is greater and replaces the previously stored rightmost value. At the same time, the last B line pixel is compared to the value stored as the leftmost pixel for the scan line; and the least value is stored as the leftmost pixel for the scan line. The algorithm proceeds in the same manner to complete the particular trapezoidal shape.

In FIG. 11(c), the X values of line A are decreasing and those of line B are increasing so that the first pixel presented on line A is the rightmost while on line B it is the leftmost. In this case, the first line A pixel is stored as the rightmost pixel and the first pixel of the B line is stored as the leftmost pixel of the scan line. The algorithm proceeds until the end pixels of each line A and B are encountered. The leftmost pixel of the A line is then compared to the leftmost boundary previously stored; and the leftmost of these is stored as the leftmost boundary of the scan line. The rightmost pixel of the B line is compared to the previously stored rightmost pixel and the least of these is stored as the rightmost boundary of the scan line. In the case shown in FIG. 11(c), the original values stored for the leftmost and rightmost pixels remain the values for the scan line.

On the next scan line, the initial pixels for lines A and B are stored as the rightmost and leftmost pixels of the scan line, respectively. Then, the algorithm proceeds to define the remaining X positions of each line until the last pixel of each of lines A and B is encountered. Again, the last pixel of the A line is compared with the value stored as the leftmost pixel and the least value stored as the leftmost pixel. In the case shown in FIG. 11(c), the previously stored value is greater and remains the rightmost value. At the same time, the last B line pixel is compared to the value stored as the rightmost pixel for the scan line, and the greater value stored as the rightmost pixel for the scan line. The algorithm continues in the same manner to complete the particular trapezoidal shape.

The final case shown in FIG. 11(d) is essentially the reverse of that shown in FIG. 11(a) in that both lines have decreasing X values. In this case the circuitry is presented the pixels of both line segments with the rightmost being presented first for each line. The two rightmost pixels are received at the same time, these are compared, and the greater (rightmost) is stored as the rightmost pixel. The algorithm proceeds until it is time to change Y. The last pixel in both lines A and B is the leftmost of each. These are compared and the least is stored as the leftmost boundary. For this scan line, the leftmost pixel, the rightmost pixel, and the Y values are thus known so the line to be scanned to the frame buffer is completely defined.

The next pixels presented are those at the next Y value. Again the first pixels received by the circuitry are the rightmost pixels of line A and line B. These are compared and the rightmost stored are the rightmost pixel of this scan line. On the last pixel of each line, the two leftmost pixels are compared, and the leftmost pixel of the two stored as the leftmost pixel of the scan line. Thus, this scan line is also completely defined. The algorithm continues selecting the ends of each scan line until the trapezoid is completely defined.

Figure 12:
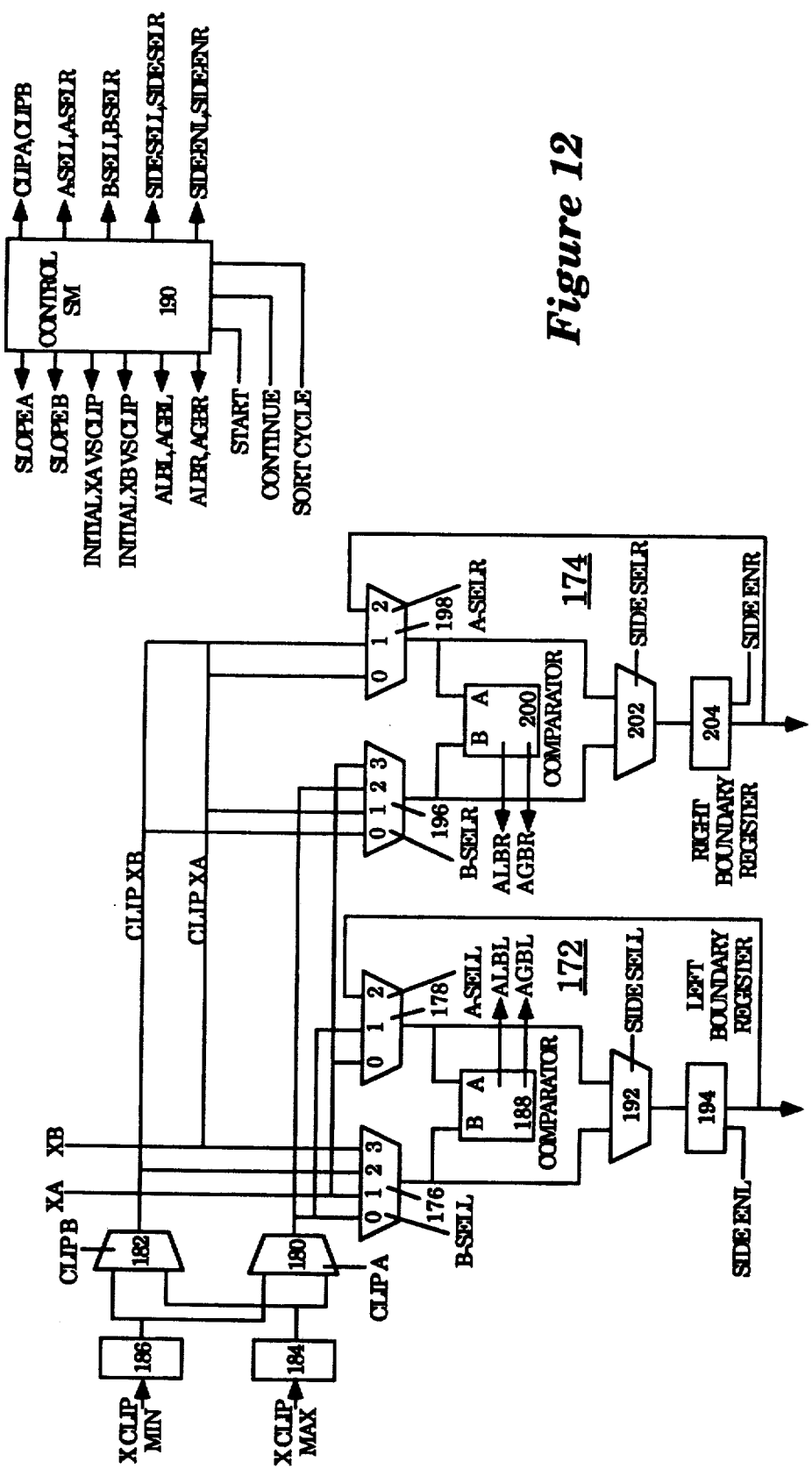
FIG. 12 is a block diagram illustrating another portion of the circuitry of a functional addressing stage which may be used in the present invention.

FIG. 12 illustrates a preferred embodiment of a circuit 170 for implementing the sorting circuitry described above. The circuit 170 includes left side comparator circuit 172 and right side comparator circuit 174. The comparator circuits 172 and 174 process the values for making the comparisons for the left and right sides of each of the scan lines as described above.

The left side circuit 172 receives input signals through a pair of multiplexers 176 and 178. The multiplexers 176 and 178 receive input signals representing the X values of the A and B line segments. The multiplexers 176 and 178 also receive input signals representing the X values of the clip window in which the quadrilaterals are to appear; these are designated ClipXA and ClipXB and are furnished by a pair of multiplexers 180 and 182 each of which receives both clip values from a pair of registers 184 and 186.

The signals provided by the multiplexers 176 and 178 are furnished to a magnitude comparator 188 which provides output signals to a state machine 190 indicating the results of the comparison. The state machine 190 uses these results and its other inputs to control a multiplexer 192 to allow the transfer of signals to a register 194 which stores the left boundary value.

The comparator circuit 174 has a similar arrangement including a pair of multiplexers 196 and 198, a comparator 200, a multiplexer 202, and a right boundary register 204.

The circuitry accomplishes this sorting even though the pixels defining the individual line segments are presented from the top of the screen down or from the bottom of the screen up, whether increasing or decreasing in X progression.

In general, the operation of the circuit 170 is as follows. An operation is initiated when the state machine 190 receives a start signal. During the entire operation, the registers 184 and 186 contain the X values of the clip window in which the information is to be written. Moreover, the state machine 190 initially receives information from the comparison logic 74 regarding the comparisons of the clip window boundaries to the end of the two line segments A and B and the slopes of the two line segments, information gathered during the comparisons made in the coordinate staging operation. The state machine 190 controls the operation of the multiplexers of the circuit 170 and the timing of operations. The operation of the circuit 170 takes place on a per scan line basis.

Presuming for the following discussion that the clip window is not a factor, then the first pixels on the scan line for the A and B lines are presented on the input lines Xa and Xb to the multiplexers 176, 178, 196, and 198. The state machine selects by means of the Asel and Bsel lines the signal to be transferred by the particular multiplexer. Assuming, for example, that the case illustrated in FIG. 11(a) is being processed, the state machine 190 has inputs indicating that the X values of both line segments A and B are increasing and that the first pixels of each line segment are to be compared and the least value stored. The state machine 190, therefore, provides signals transferring the Xa input signal on line 0 of multiplexer 178 and the Xb input signal on line 3 of multiplexer 176. These signals are compared by comparator 188, and a signal indicating which is least is sent to the state machine 190. The machine 190 then enables the multiplexer 192 to select the least value, that occurring on the line from multiplexer 178, and transfer the value to the register 194 which stores the left boundary indication. At this point in the process, the right boundary register 204 is not initialized.

When the state machine 190 receives a signal indicating that a change in the scan line (a change in Y value) is to occur, the multiplexers 196 and 198 receive the last input values Xa and Xb and transfer those values to the comparator 200 where the determination that Xb is larger than Xa is made and sent to the state machine 190. This causes the state machine 190 to enable the multiplexer 202 to transfer the greater value to the right boundary register 204.

In this manner, the values necessary to describe the first scan line of the case of FIG. 11(a) are determined. The remainder of the area to be described between the line segments A and B is determined scan line by scan line in the same manner with the circuit 172 determining and storing the least X value and the circuit 174 determining and storing the greatest X value which are necessary to describe each scan line.

In the case illustrated in FIG. 11(b), presuming no clipping, the first signal Xa at terminal 0 of the multiplexer 178 is transferred by the multiplexer 192 to storage in the left boundary register 194. In like manner, since the line segment has decreasing X values, the first Xb value to be encountered is the rightmost in the illustration; this is transferred via the multiplexers 196 and 202 to storage in the right boundary register 204. As the last pixel on the scan line is reached, the Xb value is transferred by the multiplexer 176 and compared to the value stored in the left boundary register 194 (furnished at terminal 2 of the multiplexer 178) in the comparator 188. Since the value already stored is the lesser, it is retained in the register 194. The last Xa value is transferred by the multiplexer 196 and compared to the value stored in the right boundary register 204 (furnished at terminal 2 of the multiplexer 198) in the comparator 200. Since the value already stored is greater, it is retained in the register 204.

On the next scan line, a similar operation takes place. The first Xa value and the first Xb values are stored in the leftmost and rightmost registers, respectively. When the end of the scan line is reached and it is time to transfer to the next scan line, the last Xb value is compared to the value stored in the left boundary register 194, the Xb value being the lesser is stored as the left boundary value. The last Xa value is compared to the value in right boundary register 204 and, being greater, replaces the value in the right boundary register 204.

As the end of each scan line is reached, the values in the registers 194 and 204 are transferred to the mask generation stage 37 for use by the frame buffer and display at the output display.

As pointed out above, any operation begins upon a start signal being received by the state machine 190. At that time, the two registers 184 and 186 contain the X values of the right and left edges of the clip window. The state machine 190 keeps track of the appropriate clip window edges to compare against Xa and Xb to check for visibility and sends a signal to the multiplexers 180 and 182 to indicate whether the A and B values should be compared against the left or right side of the clip window.

In the default condition of the state machine 190, that is, when the machine 190 is not otherwise controlling the operation of the circuit 170 for actual left or right boundary determinations, the default values appearing on the 0 lines to the multiplexers 176, 178, 196, and 198 are passed by those multiplexers and compared by the comparators 188 and 200. In this manner, the Xa value is compared to the ClipXa clip window value and Xb is compared to the ClipXb clip window value. This comparison is passed to the state machine 190 which remembers this for later use. If it determined that Xa, for instance, is outside the clip window, then when a boundary determination cycle occurs, the value of ClipXa is passed through the appropriate multiplexer (176, 178, 196, or 198) instead of Xa whenever Xa is logically required to be passed. The same substitution takes place for Xb using ClipXb when appropriate.

It should be noted that the manner in which horizontal clipping is applied by the circuitry of this invention is adapted to conserve clock cycles. For example, since the default condition is a comparison of the clip window X values to the Xa and Xb values, this will usually occur during a cycle in which no other comparisons are being made so that no time is lost to the comparison. For example, in FIG. 11(a) no comparison is occurring during the clock time in which the second pixel from the left on the lowest scan line for line segment A occurs; consequently, a clip window check at this time causes no delay to the circuitry. The capability of this circuitry to apply left and right clip windows to the information in parallel with the testing of the various pixels on any scan line in a manner that no extra clock time is taken for clipping the particular quadrilateral to be drawn to the window is especially important to the high speed operation of the graphics accelerator of this invention. This capability assists the functional addressing stage 36 in operating at the input band width of the frame buffer being driven by the graphics accelerator. This hardware clipping of the sides of a quadrilateral along with the top and bottom clipping provided by the functional addressing stage 36 allows the system to operate without the use of the usual requirement of applying a software algorithm such as the Sutherland-Hodgeman algorithm to a particular figure to be drawn in a sequential manner and substantially reduces the time taken for displaying graphical figures.

MASK GENERATION

This logic performs a simple task compared to the previous blocks. Its responsibility is to request memory accesses from the data path logic. It will request as many 16-pixel accesses as it takes to process all pixels which it has been passed between the left and right boundaries. The memory accesses can progress from left-to-right or from right-to-left as determined at the top of the addressing pipeline by the status generator 76. The mask generation unit 37 also provides the data path 32 with the X/Y address of each access, with data alignment information, with a read/write indication, and with information to determine which pixels in the 16-bit access are to be considered modifiable (included in the operation). Between memory requests, addresses are adjusted (modulo 16) unless the operation is a draw or a font operation in high resolution monochrome mode where (modulo 64) adjustments are used.

Linear Address Generator

Finally, the information regarding the addresses of information to be presented on a computer output display is available in logical order with the X and Y address of each access defined from the mask generation stage 37 and is presented to a linear address generator 38. The linear address generator 38 translates the rectilinear coordinates available into the linear address space used to access the frame buffer for the output display.

The circuitry provides a unique arrangement for realizing a number of different resolutions all of which may be accomplished on a particular output display through the use of a minimal number of gates. This circuitry therefore allows the adaptation of the graphics accelerator of the invention to a number of different computer systems and maintains, while doing so, the low cost desideratum emphasized above. A particular arrangement for accomplishing the function of the linear address generator is disclosed in U.S. patent application Ser. No. 07/287,392, *Method and Apparatus for Translating Rectilinear Information into Scan Line Information for Display by a Computer System*, Malachowsky and Priem, filed Dec. 20, 1988.

In order to translate from rectilinear coordinates designated in X and Y values, the number of pixels on each Y scan line (the X resolution) are multiplied by the Y value; and this amount is added to the particular X value. The total is the serial (linear) value from the beginning of the scan at the top left of the output display (the rectilinear position at which $X=0$ and $Y=0$).

In prior art arrangements, when different resolutions are desired for the output display and these resolutions are variations by a power of two of the base resolution, it is a simple matter to shift the Y value provided for the register by one or more bits in either direction to reach the correct multiplier. In this manner, resolutions of 512 and 2048 may easily be provided on the same display as a base resolution of 1024. However, as resolutions of output displays improve, the use of lower resolutions is waning with sophisticated programs and the ability of the display to provide the higher resolution (an order of magnitude increase in resolution with a power of two increase in pixels per scan line) may also be in doubt. Consequently, the ability to provide more than one or two resolutions using this output method is also unlikely.

The system of the present invention is able to provide display resolutions of 1024, 1152, 1280, and 1600 pixels per scan line, much more useful resolutions than the power of two resolutions which may be attained with presently available displays.

Figure 13:
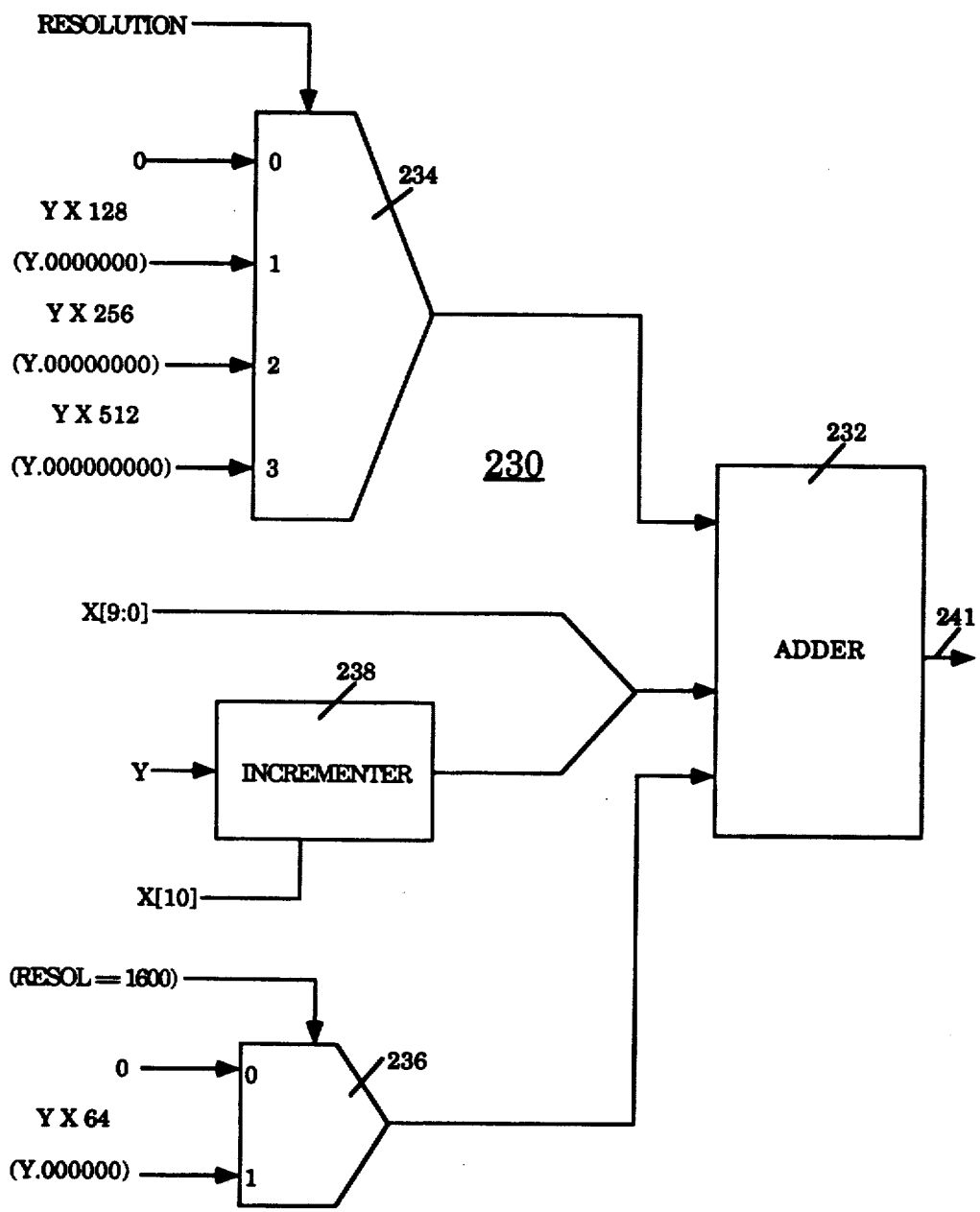
FIG. 13 is a block diagram of a circuit which may be utilized in a linear address generator of the present invention.

FIG. 13 illustrates a preferred circuit 230 which may be utilized to accomplish this result. The circuit 230 includes an adder 232 which receives inputs on three different lines. The upper line to the adder 232 shown in FIG. 13 is the output from a multiplexer 234 which selects an input on one of four input lines. These four lines are zero, Y multiplied by 128, Y multiplied by 256, and Y multiplied by 512. It should be noted that a power of two multiplication implied by these inputs may be simply accomplished by a shift left with zeroes provided to fill the empty bits from the right. This may be accomplished in hardware by simply grounding a number of lower valued lines to accomplish the zero fill at the appropriate bit positions. The value is selected by a signal to the multiplexer 234 which depends on the resolution desired.

The lower line shown in FIG. 13 to the adder 232 is the output from a multiplexer 236 which selects the input on one of two lines. These two lines are zero and Y multiplied by 64. The value is also selected by a signal to the multiplexer 236 which depends on the resolution desired.

The middle input to the adder is provided by a conditional incrementer 238 which receives the Y value and the high bit input from the X value. Depending on the X bit value, the Y value is or is not incremented. If the X bit value is a one, then the Y value has its lowest bit incremented, and all other bits which receive carries through the incrementing operation are also incremented. If the X bit value is a zero, then the Y value is not changed. This result is simply appended to the high end of the value of the first ten bits of the X value (the zero through nine bit positions) and produces at the input to the adder 232 a result which is equal to the sum of the Y value multiplied by 1024 plus the X value.

To reach any of the resolutions, the appropriate resolution is provided as input to the two multiplexors 234 and 236. If the resolution is 1024, for example, the multiplexer 234 provides zero as its output, the multiplexer 236 provides zero as its output, and the incrementer 238 provides the Y incremented value to be appended to the first ten bits of the X value to give the entire result, i.e., the 1024 resolution multiplied by the Y value plus the X value.

If the resolution is 1152, on the other hand, the multiplexer 234 provides Y multiplied by 128 as its output, the multiplexer 236 provides zero as its output, and the incrementer 238 provides the Y incremented value to be appended to the first ten bits of the X value to give the result, i.e., the Y value multiplied by 1024 plus the Y value multiplied by 128 plus the X value.

If the resolution is 1280, the multiplexer 234 provides Y multiplied by 256 as its output, the multiplexer 236 provides zero as its output, and the incrementer 238 provides the Y incremented value to be appended to the first ten bits of the X value to give the entire result, i.e., the Y value multiplied by 1024 plus the Y value multiplied by 256 plus the X value.

If the resolution is 1600, the multiplexer 234 provides Y multiplied by 512 as its output, the multiplexer 236 provides Y multiplied by 64 as its output, and the incrementer 238 provides the Y incrementer value to be appended to the first ten bits of the X value to give the entire results, i.e., the Y value multiplied by 1024 plus the Y value multiplied by 512 plus the Y value multiplied by 64 plus the X value.

The Speed of the Graphics Accelerator in Drawing Quadrilaterals

In order to appreciate the speed at which the graphic accelerator of the present invention operates in accomplishing the drawing function, it seems reasonable to compare the method of the prior art for accomplishing that function. The usual practice is to accomplish the drawing function in software in a serial fashion under command of the central processing unit. This may, however, be speeded by implementing the same function in microcode; and this is the manner in which many graphic accelerators operate. In any case, the functions all occur serially whether under control of the central processing unit or when implemented in microcode on a dedicated processessor.

The typical central-processing-unit-driven software sequencing just to set up for drawing a single quadrilateral for determining the scan lines may take up to one millisecond to accomplish. The operation requires serial operations of counting the vertices to determine the type of polygon, selecting the algorithm for the polygon, comparing the vertices to find the top vertex, determining the points connected, and breaking the figure in subparts. The arrangement of the present invention accomplishes a similar amount of work in from eighty to one hundred twenty nanoseconds. The typical prior art arrangement then determines the points defining a scan line and fills the scan line a pixel at a time. The arrangement of the present invention has a data path of 128 bits so that it is able to fill the scan line sixteen pixels at a time. The prior art method requires that clipping be accomplished by applying a serial clipping algorithm. The hardware clipping of the present invention has been discussed above. Ultimately, the present invention provides output at a rate up to one million vectors per second while the software procedure produces output at a rate of tens of thousands of vectors per second.

The Data Path

Figure 14:
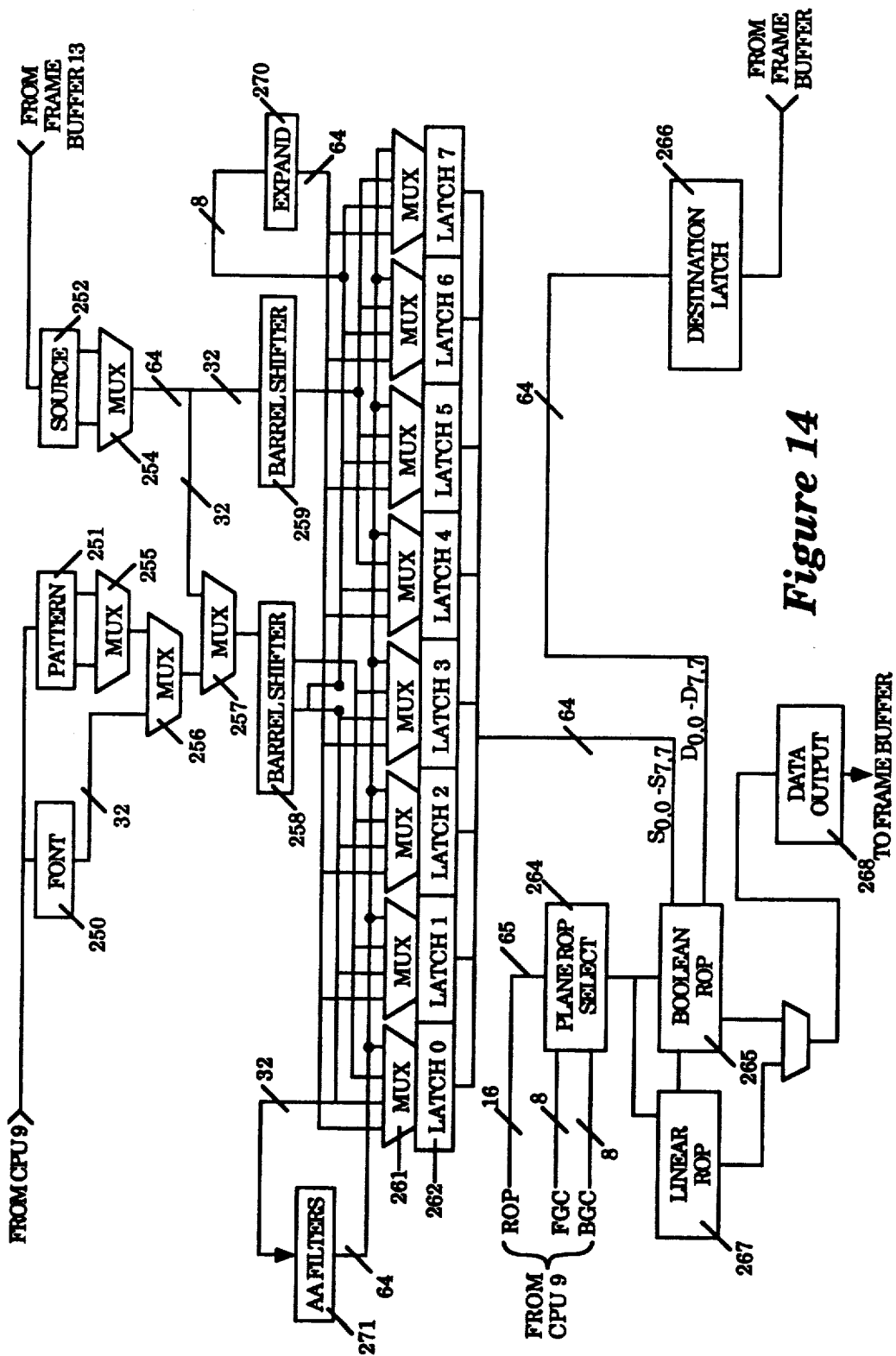
FIG. 14 is a block diagram of circuitry which may be used in a data path and memory interface unit of the present invention.

FIG. 14 illustrates circuitry which may be used in the data path of the present invention. Various aspects of that circuitry including particularly the various raster operations practiced by the circuitry of the graphics accelerator have been particularly described in patent application Ser. No. 07/257,853, *Mutliplexer Implementation for Raster Operations Including Foreground and Background Colors*, Priem, et al., filed Oct. 14, 1988; Ser. No. 07/257,985, *Method and Apparatus for Optimizing Selected Raster Operations*, Priem, et al., filed Oct. 14, 1988; and Ser. No. 07/258,133, *Anti-Aliasing Raster Operations*, Priem, et al., filed Oct. 14, 1988.

The data path and memory interface 32 described in FIG. 14 receives information destined for the frame buffer from the central processing unit and stores that information in registers related to its use. If the information relates to the font operation, it is stored in a font data register 250. If the information relates to the drawing of quadrilateral figures, it is stored in a pattern register 251. In like manner, information may be taken from the frame buffer and stored in a source register 252 for the various block move operations. The information in registers 250, 251, and 252 may be moved therefrom under control of a series of multiplexers 254, 255, 256 and 257 to barrel shifters 258 and 259. The barrel shifters 258 and 259 are used in the different operations of the graphics accelerator to accomplish the alignment of the data for each particular operation at an appropriate sixteen pixel boundary as is more particularly explained in the detailed description provided in the various copending patent applications referred to immediately above. The information from the barrel shifters 258 and 259 is provided to eight individual multiplexors referred to in general by the single number 261 and stored in eight individual latches referred to in general as 262. The values in the latches 262 are available for utilization by circuitry including plane raster op select circuit 264, linear raster op circuit 267, and boolean raster op circuit 265, in conjunction with destination latch 266 for provision through data output 268 to the frame buffer.

Also included within the circuitry of FIG. 14 is an expand circuit 270 which is utilized for controlling the expansion of monochrome to eight bit color in order to provide foreground and background color without requiring the storage of eight individual bits for each pixel. It will be noted that such an arrangement assists in accomplishing the cost effectiveness of the circuitry, a desideratum discussed above at some length. The details of the color expansion circuitry are discussed in the copending application Ser. No. 07/257,853, described above.

The Font Operation

The font operation is used when providing a figure for display which is pre-computed and furnished in its entirety to the graphics accelerator by the central processing unit. The addresses for the left and right edges of the particular font (figure) to be provided and its Y coordinate are furnished to the X/Y coordinate registers 70 of the coordinate staging unit 33. In particular, the $X_0$ and $X_1$ registers are furnished coordinate values defining the origin and width of the particular font to be drawn and the $Y_0$ register is furnished the Y coordinate of the particular scan line to which the width applies. Clip window information is provided to the clip coordinate register 71. The coordinate staging unit 33 also receives from the central processing unit information designating that a font operation is to be accomplished, and the font data is furnished to the font registers 250 described in FIG. 14.

The addresses described above are retained in the coordinate registers 70 illustrated in FIG. 7, awaiting the receipt of the font data in the registers 250. When the font data is received, the address contained in the coordinate register 70 is processed in an operation analogous to a status register read for a draw or block move operation. The comparison logic and result storage unit 74 contains the results of the appropriate comparisons discussed above with respect to the quadrilateral figures. If clipping is to be accomplished, then the X clip values are substituted for the X values of the particular font being processed. If Y values are to be clipped, then nothing happens until a value appearing within the window is processed through the X/Y coordinate registers 70. Except for clipping, the font information is simply passed through the various stages including the coordinate sequencing stage 35 and the functional addressing stage 36 since the other operations furnished by these stages are unnecessary to this font operation.

At the mask generation unit 37, the pixels describing the particular font are aligned for correct access to the frame buffer; and the data path and memory interface 32 is signalled so that the font data may be provided from the font registers 250, shifted for correct alignment through the barrel shifter 258, and ultimately provided at the data output 268 for transfer to the frame buffer.

As explained above, the font data can represent thirty-two bits of one bit per pixel monochrome information, 32 bits of one bit per subpixel high resolution monochrome information, or four pixels of eight bits per pixel color information. If low resolution monochrome information is provided, this information is expanded through the use of the expand unit 270 while high resolution monochrome utilizes anti-aliasing filter 271, both as more particularly described in the copending patent application Ser. No. 07/257,853 to provide the appropriate foreground and background colorsor shades.

THE DRAWING OPERATION

Most of the details of the drawing operation have been explained in substantial detail at other parts of this specification. However, the movement of data has not been described at any length. The data for the drawing of a quadrilateral is provided from the central processing unit to the pattern registers 251. The pattern registers define a sixteen bit by sixteen bit monochrome pattern which may be implemented within the area bounded by the sides of the quadrilateral. This allows various individual designs to be described within a quadrilateral. However, in most situations, a single color will be provided for the entire quadrilateral in order to implement the high speeds desired by the graphics accelerator of this invention. Therefore the central processing unit may provide a simple override consisting of all zeros or all ones to the pattern registers 251.

In a quadrilateral drawing operation, the coordinates of the vertices are furnished to the X/Y coordinate register 70 of the coordinate staging area; the clip window values are furnished to the clip register 71. The central processing unit reads the draw status register to determine whether the draw operation scan be accomplished by the hardware. If the single bit (the sign bit) of the status word indicates that the operation is to be accomplished by the hardware, that is, that the figure fits within the test window, that the object can be drawn by the hardware, that the circuitry is not otherwise busy, that the coordinates are not too large, that no other exception exists, then the operation starts automatically. It should be noted that if the sign bit of the status word indicates that the graphics accelerator cannot accomplish the draw operation, this information is returned to the central processing unit along with the other information in the status word. This information tells the central processing unit why the operation cannot be accomplished and provides sufficient information that the central processing unit is able to accomplish the operation in the software.

Given the direction the drawing is to be accomplished by the hardware, the information with regard to the vertices is passed to the coordinate sequencing state 35 where the quadrilateral is decomposed, to the functional addressing state 36 where the X values for each scan line are generated and the Y clipping is applied, and where the segments are sorted and placed in appropriate condition as well as clipped with regard to the X clip window values for transfer to the linear address generator 38. At the mask generation stage 37, the data path memory interface 32 is signalled and the information contained in the pattern registers 251 is transferred through the various multiplexors to the latches 262 so that it available for ultimate transfer to the frame buffer.

THE BLOCK MOVE OPERATION

The block move operation is one in which a rectangular area presently stored in the frame buffer is move to another position in the frame buffer, often with a raster operation being performed on the information. The first step of the operation requires that the address of the information to be moved and the address to which it is to be moved be stored in the X/Y coordinate registers 70. In a block move operation, the addresses from which the data is to be moved are stored in the X0Y0 register (the upper left corner of the source rectangle) and X1Y1 register (the lower right corner of the source rectangle) of the X/Y coordinate registers and the addresses to which the data is to be moved are stored in the Y2Y2 (the upper left corner of the destination rectangle) and Y3Y3 (the lower left corner of the destination rectangle) registers.

The pertinent clip window information is stored in the clip coordinate registers 71, and the test window information is entered in the test window control 73. The operation begins with a read of the block move status register. Presuming that the status bit does not indicate an error condition, the address comparisons are derived from the comparison logic and result storage unit 74 at the coordinate sequencing stage 35 and the functional addressing stages 36 where clipping is applied to the destination rectangle in the manner described above with respect to the draw operation. It should be noted that the status generation logic 76 has also determined the direction in which the operation is to proceed from the direction in which the move is to be made from source to destination so that the various operations may take place in the least time with the least clipping and fewest page boundary crossings.

It should also be noted that with the preferred circuitry, some policy decisions have been made. Only the destination rectangle is cliped because there is insufficient circuitry to clip both source and destination rectangles. Consequently, if the source rectangle is to be clipped, then the operation is one to be conducted in software; and the block move status word indicates this action. Moreover, if the source is hidden, no move is undertaken by the block move apparatus but the information that the operation is to be ignored is conveyed to the central processing unit via the status word.

If the destination rectangle is visible, the clipping operation begins in the manner explained. If the destination is not visible, then at the functional addressing state, the X and Y values (or either) are incremented under control of the state machine 160 until the destination rectangle becomes visible at which point clipping begins. This ability to omit the actual read and write operations unit the destination rectangle is visible is another optimization provided by the accelerator to maintain the speed of operation at that of the frame buffer input band width. The destination rectangle clipping, if any, takes place and the clip values are substituted for the values of the rectangle edges if necessary.

At the functional addressing stage 36, the sequencing of the data begins. A read request for the information in the source rectangle of the frame buffer is issued; the data is placed in the source register of the data path 32 and then written to the destination rectangle in the frame buffer by means of a write request. Because the information is only handled in memory access aligned groups in writing to the frame buffer, it may require more than one write cycle to write the entire sixteen pixels of the source access to the frame buffer so two write access cycles are allowed for this operation in the sequencing operation. This is within the limits provided in meeting the input bandwidth of the frame buffer. It should be noted that another optimization provided for maintaining speed is that once the starting edge of the destination rectangle has been obtained on the first scan line written to the frame buffer, this value is stored (157, 159 in FIG. 10) so that it need not be ascertained again and the time taken on the first scan line to do so need not be repeated.

THE TRANSFORMATION UNIT

One of the major functions which may be accomplished by a graphics accelerator is to handle the matrix arithmetic necessary for moving graphics images about on the computer output display. Such matrix operations are necessary in handling both two and three-dimensional graphical figures in order to rotate, translate, scale, and otherwise manipulate the particular graphics figures to be displayed on the computer output display. A graphics accelerator can be very useful in accomplishing these operations because it can relieve the central processing unit of the need to serially recompute various vertices of the figures to be manipulated with each manipulation of the figure to be displayed. A graphics accelerator may accomplish the many operations necessary by means of hardware manipulation of the data and greatly speed the operation of the computer system.

However, a major problem of prior art system handling matrix arithmetic in obtaining extremely rapid operations derives from the need of a graphics accelerator to manipulate data in a plurality of different number formats. For example, information handled by a central processing unit normally appears in an integer format and must appear in that format when utilized by an output display because a display does not deal in fractions of pixels. Address information handled by the drawing unit 30 of this invention is in integer format. On the other hand, many manipulations with very large numbers used in scientific processing require the use of a floating point format. Often floating point format is used by a computer for storing addresses because of the large range available. Such numbers must be dealt with in presenting graphics and must ultimately be translated into the integer format for presentation on a computer output display. Additionally, a format described by the acronym FRACT is especially useful in manipulating a particular type of graphics display in a process referred to as shape manipulation. The FRACT number system uses an entirely different format than that of the integer and floating point number systems.

In prior art computer systems, the central processing unit (CPU) has been called upon to accomplish most number conversions. Thus, although a floating point number may be processed by use of a floating point coprocessor, it must ultimately be converted by a processor of the system into integer format so that it may be used in displaying a particular graphical output on a computer output display. The translation of numbers between different number formats by a processor is handled serially and substantially delays the operation of the system.

Figure 16A:
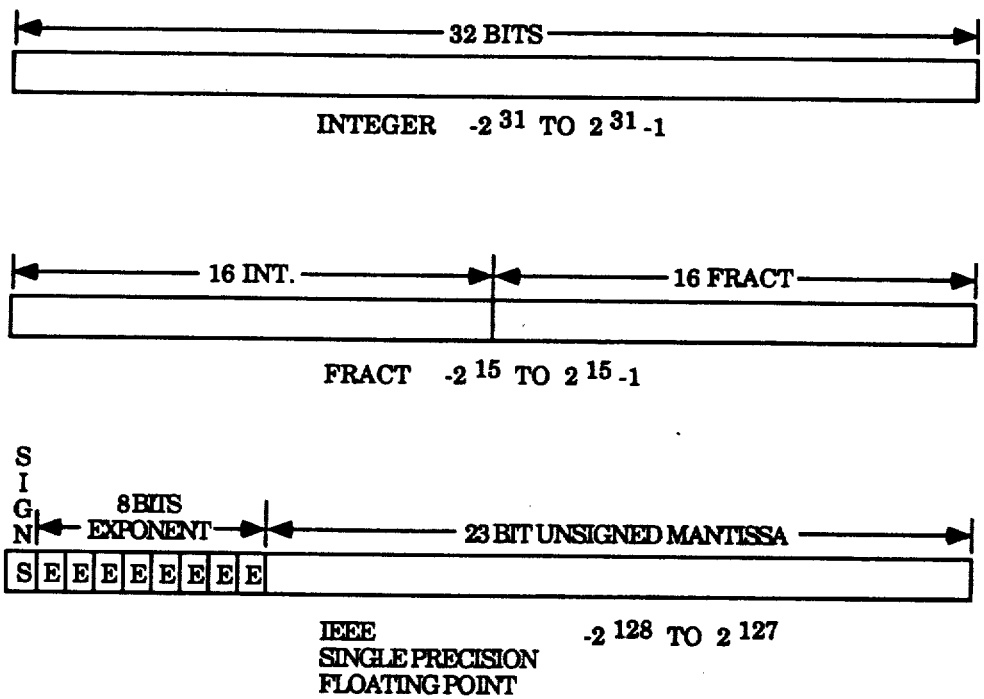
FIG. 16(a) is an illustration of three number formats which may be utilized in the graphics accelerator of the present invention.

FIG. 16(a) shows three number formats which may be utilized in a computer system having a graphics accelerator constructed in accordance with the present invention. The first number format illustrated is the integer format which includes thirty-two bits of twos complement information. The binary point is assumed to appear to the right of the bit at the extreme right. The integer format is capable of handling numbers from $-2^{31}$ through $2^{31}-1$ in a thirty-two bit format. The integer format is capable of handling integers only and does not handle fractions or decimal numbers.

The second format illustrated in FIG. 16(a) is the so-called FRACT format. In this format, thirty-two bits of storage are provided in a twos complement format. The leftmost sixteen bits in the FRACT format represent binary integers while the rightmost sixteen bits represent fractional parts thereof. While the bits of the integer portion represent positive powers of two beginning at $2^0$ increasing to the left from the binary point, the bits of the fractional portion represent negative powers of two beginning with $2^{-1}$ and increasing in negative power to the right from the point. Using this format, an integer and a fractional portion may be easily represented.

The third number format illustrated in FIG. 16(a) is the Institute of Electrical and Electronics Engineers (IEEE) single precision floating point format which provides in its thirty-two bit positions a sign bit to the extreme left, eight bits which are utilized to represent an exponent, and twenty-three bits which are used to represent the unsigned mantissa of a floating point number. In the IEEE representation an additional bit which represents a leading one is presumed to exist at the extreme left of the twenty-three bit mantissa so that the mantissa actually includes twenty-four bits.

Figure 16B:
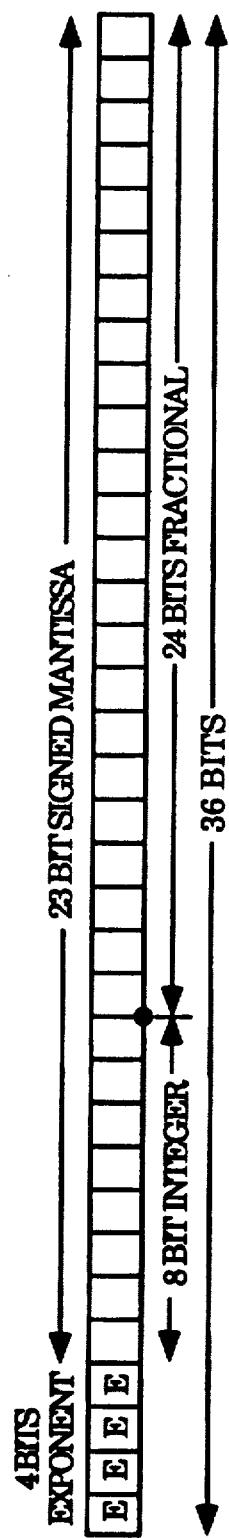
FIG. 16(b) is an illustration of the Modulo 256 with multiple tap points format used internally by the matrix transformation unit of the graphics accelerator of the present invention.

FIG. 16(b) illustrates the new number format into which each of the three number formats described in FIG. A is translated before manipulation by the graphics accelerator. This number format is utilized internally by the transformation unit of the graphics accelerator for accomplishing all the matrix arithmetic operations. Outputs of numbers utilizing this new number format are conveniently provided in each of the integer, FRACT and IEEE single precision floating point formats for further use by the system once manipulations by the transformation unit have been accomplished. For example, these results may be furnished directly to the drawing unit 30 and the coordinate staging unit 33 thereof as the XY coordinate addresses for the X/Y coordinate register 70. The system is also capable of accepting from and furnishing information to external circuitry in the internal format.

The new number format, referred to as the Modulo 256 with multiple tap points number format (hereinafter "Modulo 256"), provides thirty-six individual bit positions arranged with the leftmost four bits utilized to represent an exponent, the next eight bits utilized to represent a signed integer component, and the rightmost twenty-four bits utilized to represent a fractional component as in the FRACT number format. This number format is readily converted from each of the formats as will be illustrated. Although only four bits are provided for exponents, each increase by one of the exponent is considered to multiply the mantissa by 256 (a shift of eight bits). To read a number represented in the Modulo 256 format, the signed mantissa is multiplied by 256 raised to the power indicated by the four bits of the exponent minus eight (the high order bit of the exponent). The high order bit of the exponent is a one for all positive exponents. The one in the high order bit of the Modulo 256 format allows the easy translation to and from the IEEE format. The need for a one in the high bit position requires that decimal eight be substracted to reach the correct exponent value, however.

Considering a binary number residing in the mantissa with the binary point positioned as illustrated in FIG. 16(b). If the four exponents bits are 1000, the binary point remains in its initial position as shown in FIG. 16(b), eight bits to the right of the least significant exponent bit. If the exponent bits are 1001 indicating an exponent of one, the binary point is effectively moved eight bits to the right of the position shown in FIG. 16(b). If the exponent is 1010 indicating an exponent of two, the binary point effectively shifts sixteen bits to the right of the position illustrated in FIG. 16(b).

It is quite easy to transfer between the different conventional number formats and the Modulo 256 format. For example, to translate from the integer format simply requires that the integer number be placed with its least significant bit at the rightmost bit space of the Modulo 256 mantissa space and that the exponent of the Modulo 256 format be set to 1011 (representing an exponent of decimal three). This exponent value effectively displaces the binary point separating the integer and the fractional portions from its normal position of twenty-four bits to the left of the rightmost bit of the mantissa to the extreme right hand end of the mantissa, causing the number stored to represent an integer. The number is then normalized to better fit the bits into the space provided by the Modulo 256 format by moving the binary point as far left as possible in eight bit steps and reducing the exponent by one for each such step. Thus, if the signed integer were to require eight or less bits in total, it would be moved twenty-four bits to the left to fit into the available space and the exponent reduced by three to 1000 so that the binary point would be returned to its normal position in the Modulo 256 format. On the other hand, if the integer were to require nine bits but less than seventeen bits in total, it would be moved only sixteen bits to the left to fit into the available space and the exponent reduced by two to 1001 so that the binary point would be at eight bits to the right of its normal position in the Modulo 256 format.

In order to transfer from the FRACT number format to the Modulo 256 format, it is only necessary that the FRACT number be placed in its normal position with its least significant bit in the rightmost bit space of the Modulo 256 mantissa space and that the Modulo 256 exponent be set to 1001 (increased by one) since this effectively moves the binary point eight bits to the right as described in the discussion regarding FIG. 16(b). Then, the FRACT number is normalized in the same manner as are integer numbers by moving the integer portion as far left as possible in eight bit steps and reducing the exponent by one for each such step. Thus, if the signed integer portion were to require eight or less bits in total, it would be moved eight bits to the left to fit into the available space and the exponent reduced by one to 1000 so that the binary point would be returned to its normal position in the Modulo 256 format.

Finally to convert a number expressed in IEEE single precision format to the Modulo 256 format requires that the unsigned mantissa be converted to a signed number and that the number be shifted to adjust for the different exponent bases bits. A different form of normalization is necessary for numbers stated in IEEE single precision floating point format. Such numbers include a mantissa and an exponent; however, the exponent in IEEE format is a power of two. Thus it is necessary to compensate for the difference in the value attributed to the exponent in the floating point format and in the Modulo 256 format. Since each increase of one in the exponent of the floating point number is an increase of a single power of two while each increase of one in the exponent of the Modulo 256 format represents 256 to an additional power, it is necessary to compensate for this difference by moving the binary point in the mantissa. For example, the number $0.1011110 \times 2^{18}$ in floating point format is represented by the number $10.11110 \times 256^2$ in Modulo 256 format. The conversion requires that when the exponent representing a power of two is changed to a power of 256 the binary point in the mantissa be moved. Thus, it is often necessary both to modify the exponent to represent a correct power of 256 and to shift the binary point in the mantissa by a selected number of individual bit places in order to normalize the numbers in translating from IEEE single precision floating point format to Modulo 256 format.

Figure 16C:
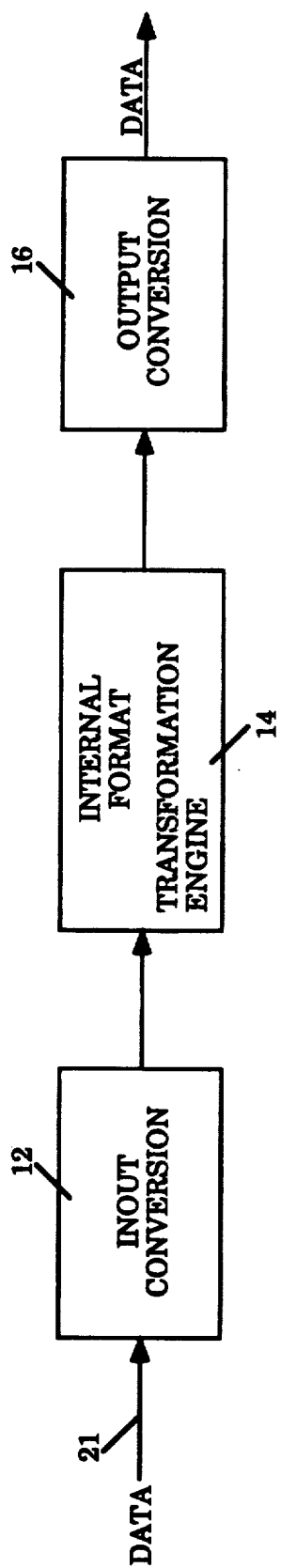
FIG. 16(c) is a block diagram illustrating the circuitry of the matrix transformation unit of the graphics accelerator of the present invention.

FIG. 16(c) illustrates in block diagram form the basic arrangement of the circuitry of the present invention. As is illustrated in FIG. 16(c) inputs are received from a data bus at an input conversion unit 312 representing integers, FRACT, and floating point format numbers. In the system in which the present invention is utilized, integers are directed to an address so that they may be handled by the input conversion unit 312 with the knowledge that they are in that format. In like manner, numbers appearing in the FRACT and floating point input formats, respectively, are directed to addresses so that they are recognized by the input conversion unit 312 as appearing in these formats which are to be converted and normalized in the manner described above for each of those formats.

The numbers presented to the input conversion unit 312 are translated into the Modulo 256 format and transferred to the transformation unit 314 of the graphics accelerator. The particulars of the circuitry for accomplishing the format translations are described in co-pending patent application Ser. No. 07/407,928, entitled *Number Conversion Apparatus*, Priem and Malachowsky, filed on Sept. 15, 1989.

The transformation engine 314 manipulates the numbers in accordance with matrix formulae well-known in the prior art adapted, however, to the unique number format of this invention and provides output to an output conversion unit 316. The particulars of the circuitry for accomplishing the number transformation are described in co-pending patent application Ser. No. 07/407,549, entitiled *Apparatus for Manipulating Numbers in a Computer*, Priem and Malachowsky, filed on Sept. 15, 1989.

The output conversion unit 16 translates numbers from the Modulo 256 format to each of the integer, FRACT, and floating point formats for further use by the system. For example, the integer format is the format in which numbers must be utilized by the drawing unit 30 and for storage in the output frame buffer. On the other hand, the FRACT format, the floating point format, and the internal Modulo 256 format may be utilized by the computer system for further operations by that system which do not relate to storage in the frame buffer. The particulars of the circuitry for accomplishing the translation between the Modulo 256 format and the other formats are described in co-pending patent application Ser. No. 07/407,928, referred to above.

It will be realized by those skilled in the art that the graphics accelerator described in this specification provides very fast operation, operation at the bandwidth of the frame buffer, with a plurality of different processors by combining a very large number of features, often unique in themselves, in a unique manner to achieve its outstanding results. Although the invention has been described with reference to particular arrangements and systems, the details of those arrangements are used for illustrative purposes only and should not be considered to limit the invention. It is, thus, to be contemplated that many changes and modifications may be made by those of ordinary skill in the art without departing from the spirit and scope of the invention. The invention should therefore be considered only in terms of the claims which follow.

We claim:

1. A graphics accelerator circuit for rapidly processing graphics information to be displayed by a computer output display on a scan line basis, said graphics accelerator circuit comprising:

interface means for receiving said graphics information to be displayed by said computer output display, said interface means comprising a plurality of flip-flops;

means for storing addresses of vertices of at least one quadrilateral corresponding to said graphics information, said means for storing comprising at least one register;

means for comparing the relative positions of said addresses of said vertices and providing signals corresponding to said comparisons, said means for comparing comprising at least one comparator, and at least one multiplexer;

means for selectively decomposing said quadrilateral into line segment portions, said line segment portions defining trapezoids, said trapezoids bounding sets of scan lines;

means for determining the coordinates of the end points of each scan line within said trapezoids;

means for translating said coordinates into scan line information for display by said computer output display;

means for providing said scan line information to said computer output display for display;

means for displaying said graphics information on a scan line basis.

2. A graphics accelerator circuit as claimed in claim 1 further comprising means for determining the direction in which said quadrilateral should be decomposed in order to most rapidly accomplish the transfer and processing of said graphics information by said graphics accelerator circuit.

3. A graphics accelerator circuit as claimed in claim 2 further comprising means for presenting scan line information in scan line order no matter what direction the decomposition of said quadrilateral has proceeded.

4. A graphics accelerator circuit as claimed in claim 2 in which the means for determining the direction in which said quadrilateral should be decomposed functions in response to the signals provided by said means for comparing the relative positions of said addresses of said vertices and providing signals corresponding to said comparisons.

5. A graphics accelerator circuit as claimed in claim 4 further comprising means for presenting scan line information in scan line order no matter what direction the decomposition of said quadrilateral has proceeded.

6. A graphics accelerator circuit as claimed in claim 1 further comprising means for receiving information regarding the position of a window in which particular data is to be presented on said computer output display, and means for providing signals representing the relations between each of said vertices of said quadrilateral and the boundaries of said window.

7. A graphics accelerator circuit as claimed in claim 6 further comprising means for determining the direction in which said quadrilateral should be decomposed in order to most rapidly accomplish the transfer and processing of said graphics information by said graphics accelerator circuit, said means functioning in response to the signals provided by said means for comparing the relative positions of said addresses of said vertices and providing signals corresponding to said comparisons, and the signals provided by said means for providing signals representing the relations between each of said vertices of said quadrilateral and the boundaries of said window.

8. A graphics accelerator circuit as claimed in claim 7 further comprising means for presenting scan line information in scan line order no matter what direction the decomposition of said quadrilateral has proceeded.

9. A graphics accelerator circuit as claimed in claim 6 further comprising means for receiving information regarding the position of a rectangle surrounding said window in which particular data is to be presented, and means for providing signals representing the relations between each of said vertices of said quadrilateral and the boundaries of said rectangle.

10. A graphics accelerator circuit as claimed in claim 9 further comprising means for determining whether a particular graphics operation is to be accomplished by said graphics accelerator circuit.

11. A graphics accelerator circuit as claimed in claim 10 in which said means for determining whether a particular graphics operation is to be accomplished by said graphics accelerator circuit comprises a status register having at least one bit position representing whether a particular graphics operation is to be accomplished by said graphics accelerator circuit.

12. A graphics accelerator circuit as claimed in claim 11 in which said status register further includes a plurality of bit positions representing exceptions which preclude said graphics accelerator circuit from accomplishing a particular graphics operation, and means for ORing the bits in said bit positions representing exceptions into said at least one bit position representing whether a particular graphics operation is to be accomplished by said graphics accelerator circuit.

13. A graphics accelerator circuit as claimed in claim 12 further comprising means for transferring said precluded graphics operations to an associated processor to be conducted.

14. A graphics accelerator circuit as claimed in claim 10 in which said means for determining whether a particular graphics operation is to be accomplished by said graphics accelerator circuit operates in response to the signals provided by said means for providing signals representing the relations between each of said vertices of said quadrilteral and the boundaries of said rectangle.

15. A graphics accelerator circuit as claimed in claim 10 further comprising means for testing the condition of said at least one bit position of said status register and launching a graphics operation if that bit does not indicate an exception.

16. A graphics accelerator circuit as claimed in claim 1 in which the means for translating said coordinates comprises means for translating said coordinates into a number of distinct resolutions for display.

17. A graphics accelerator circuit as claimed in claim 1 further comprising means for receiving information regarding the position of a rectangle surrounding a window in which particular data is to be presented, and means for providing signals representing the relations between each of said vertices of said quadrilateral and the boundaries of said rectangle.

18. A graphics accelerator circuit as claimed in claim 1 in which the means for determining the coordinates of the end points of each scan line within said trapezoids includes means for separately determining the end points of each scan line on each of the bounding line segments simultaneously.

19. A graphics accelerator circuit as claimed in claim 1 in which the means for selectively decomposing said quadrilateral into line segment portions comprises a matrix implemented in circuitry.

20. A graphics accelerator circuit as claimed in claim 1 further comprising circuitry for clipping said quadrilateral to fit within a particular window to be displayed on said computer output display.

21. A graphics accelerator circuit as claimed in claim 20 in which the circuitry for clipping said quadrilateral comprises means for determining whether a particular scan line of information to be displayed in said particular window lies within said particular window.

22. A graphics accelerator as claimed in claim 20 in which the circuitry for clipping said quadrilateral comprises means for comparing the horizontal values for said quadrilateral on each scan line to be displayed in said particular window with the left and right edges of said window to determine if the values lie within said particular window.

23. A graphics accelerator circuit as claimed in claim 1 further comprising means for translating numbers in a first number format to numbers stated in an internal number format, means for manipulating numbers based in the internal number format utilizing conventional matrix transformation operations, and means for translating numbers stated in the internal number format into numbers in the first number format.

24. A graphics accelerator as claimed in claim 23 in which said means for translating numbers in a first number format to numbers stated in an internal number format comprises means for translating numbers in a first number format to numbers stated in Modulo 256 with multiple tap points number format, said means for manipulating numbers based in an internal number format comprises means for manipulating numbers based in Modulo 256 with multiple tap point format utilizing conventional matrix transformation operations, and in which said means for translating numbers stated in the internal number format into numbers in the first number format comprises means for translating numbers stated in Modulo 256 with multiple tap points number format into numbers in the first number format.

25. A graphics accelerator circuit as claimed in claim 23 in which said first number format is an integer number format.

26. A graphics accelerator circuit as claimed in claim 23 in which said first number format is a floating point number format.

27. A graphics accelerator circuit as claimed in claim 23 in which said first number format is a FRACT number format.

28. A graphics accelerator circuit as claimed in claim 1 in which said interface means comprises means for receiving graphics information both synchronously and asynchronously.

29. A graphics accelerator circuit as claimed in claim 1 wherein said interface means comprises means for storing the address of a block of data to be displayed in said output display, and means for moving said block of data to a new position on said output display by providing a new address for said block of data.

30. A graphics accelerator circuit as claimed in claim 29 further comprising means for receiving information regarding the position of a window on said computer output display in which said block of data is to be presented, and means for providing signals representing the relations between each of the boundaries of the new position of said block of data and the boundaries of said window.

31. A graphics accelerator circuit as claimed in claim 29 further comprising means for determining the direction in which said block of data should be processed in order to most rapidly accomplish transfer and processing of the information by the said graphics accelerator circuit.

32. A graphics accelerator circuit as claimed in claim 31 in which the means for determining the direction in which said block of data should be processed in order to most rapidly accomplish the transfer and processing of said graphics information by said graphics accelerator circuit functions in response to signals provided by said means for providing signals representing the relations between each of the boundaries of the new position of said block of data and the boundaries of said window.

33. A graphics accelerator circuit as claimed in claim 32 further comprising means for presenting scan line information in scan line order no matter what direction processing of said block of data has proceeded.

34. A graphics accelerator circuit as claimed in claim 29 further comprising means for presenting scan line information in scan line order no matter what direction the processing of the information by the graphics accelerator circuit has proceeded.

35. A graphics accelerator circuit as claimed in claim 29 further comprising means for receiving information regarding the position of a rectangle surrounding a window in which particular data is to be presented, and means for providing signals representing the relations between the boundaries of the new position of said block of data and the boundaries of said rectangle.

36. A graphics accelerator circuit as claimed in claim 35 further comprising means for determining whether a particular graphics operation is to be performed by said graphics accelerator circuit wherein said means operates in response to the signals provided by said means for providing signals representing the relations between each of the boundaries of the new position of said block of data and the boundaries of said rectangl 37. A graphics accelerator circuit as claimed in claim 36 further comprising means for presenting scan line information in scan line order no matter what direction the decomposition of said quadrilateral has proceeded.

38. A graphics accelerator circuit as claimed in claim 29 in which the means for translating said coordinates into scan line information comprises means for translating said coordinates into a number of distinct resolutions for display.

39. A graphics accelerator circuit as claimed in claim 29 further comprising means for receiving information regarding the position of a rectangle surrounding a window in which said block of data is to be presented, and means for providing signals representing the relations between each of the boundaries of the new position of said block of data and the boundaries of said rectangle.

40. A graphics accelerator circuit as claimed in claim 29 further comprising circuitry for clipping said block of data to fit within a particular window to be displayed on said computer output display.

41. A graphics accelerator circuit as claimed in claim 40 in which said circuitry for clipping said block of data comprises means for determining whether a particular scan line of information to be displayed in said particular window lies within said particular window.

42. A graphics accelerator circuit as claimed in claim 40 in which said circuitry for clipping said block of data comprises means for comparing the horizontal values of said block on each scan line to be displayed in said particular window with the left and right edges of the window to determine if the values lies within said particular window.

43. A graphics accelerator circuit as claimed in claim 42 in which said first number format is an integer number format.

44. A graphics accelerator circuit as claimed in claim 42 in which said first number format is a floating point number format.

45. A graphics accelerator circuit as claimed in claim 42 in which said first number format is a FRACT number format.

46. A graphics accelerator circuit as claimed in claim 29 further comprising means for translating numbers in a first number format to numbers stated in an internal number format, means for manipulating numbers based in the internal number format utilizing conventional matrix transformation operations, and means for translating numbers stated in the internal number format into numbers in the first number format.

47. A graphics accelerator circuit as claimed in claim 46 in which said means for translating numbers in a first number format to numbers stated in an internal number format comprises means for translating numbers in a first number format to numbers stated in Modulo 256 with multiple tap points number format, said means for manipulating numbers based in an internal number format comprises means for manipulating numbers based in Modulo 256 with multiple tap point format utilizing conventional matrix transformation operations, and in which said means for translating numbers stated in the internal number format into numbers in the first number format comprises means for translating numbers stated in Modulo 256 with multiple tap points number format into numbers in the first number format.

48. A graphics accelerator circuit as claimed in claim 29 in which said interface means comprises means for receiving said graphics information both synchronously and asynchronously.

49. A graphics accelerator circuit as claimed in claim 29 further comprising means for determining whether a particular graphics operation is to be accomplished by said graphics accelerator circuit.

50. A graphics accelerator circuit as claimed in claim 49 in which said means for determining whether a particular graphics operation is to be accomplished comprises a status register having at least one bit position representing whether a particular graphics operation is to be accomplished by said graphics accelerator circuit.

51. A graphics accelerator circuit as claimed in claim 50 in which said status register further includes a plurality of bit positions representing exceptions which preclude said graphics accelerator circuit from accomplishing a particular graphics operation, and means for ORing the bits in said bit positions representing exceptions into said at least one bit position representing whether a particular graphics operation is to be accomplished by said graphics accelerator circuit.

52. A graphics accelerator circuit as claimed in claim 51 further comprising means for transferring said precluded graphics operations to an associated precessor to be conducted.

53. A graphics accelerator circuit as claimed in claim 49 in which said means for determining whether a particular graphics operation is to be accomplished by said graphics accelerator circuit operates in response to the signals provided by said means for providing signals representing the relations between each of said vertices of said quadrilateral and the boundaries of said rectangle.

54. A graphics accelerator circuit as claimed in claim 49 further comprising means for testing the condition of said at least one bit position of said status register and launching a graphics operation if that bit does not indicate an exception.

55. A graphics accelerator circuit as claimed in claim 1 wherein said interface means further comprises means for storing the address and data regarding a figure to be displayed on said computer output display.

56. A graphics accelerator circuit as claimed in claim 55 in which said means for storing the address and data comprises means for storing the scan line on which said data is to appear, and means for storing the position of said data on such scan line.

57. A graphics accelerator circuit as claimed in claim 55 further comprising means for receiving information regarding the position of a window on said computer output display in which said figure is to be presented, and means for providing signals representing the relations between the position of said figure and the boundaries of said window.

58. A graphics accelerator circuit as claimed in claim 55 further comprising means for receiving information regarding the position of a rectangle surrounding a window in which said figure is to be presented, and means for providing signals representing the relations between the position of said figure and the boundaries of said rectangle.

59. A graphics accelerator circuit as claimed in claim 55 further comprising means for determining whether a particular graphics operation is to be accomplished by said graphics accelerator circuit, wherein said means operates in response to the signals provided by said means for providing signals representing the relations between the position of said figure and the boundaries of said rectangle.

60. A graphics accelerator circuit as claimed in claim 55 in which said means for translating said coordinates comprises means for translating said coordinates into a number of distinct resolutions for display.

61. A graphics accelerator circuit as claimed in claim 55 further comprising circuitry for clipping said figure to fit within a particular window to be displayed on said computer output display.

62. A graphics accelerator circuit as claimed in claim 61 in which said circuitry for clipping comprises means for determining whether a particular scan line of information to be displayed in said particular window lies within said particular window.

63. A graphics accelerator circuit as claimed in claim 61 in which said circuitry for clipping comprises means for comparing the horizontal values of said figure on each scan line to be displayed in said particular window with the left and right edges of the window to determine if the value lies within said particular window.

64. A graphics accelerator circuit as claimed in claim 55 further comprising means for translating numbers in a first number format to numbers stated in an internal number format, means for manipulating numbers based in the internal number format utilizing conventional matrix transformation operations, and means for translating numbers stated in the internal number format into numbers in the first number format.

65. A graphics accelerator circuit as claimed in claim 64 in which said means for translating numbers in a first number format to numbers stated in an internal number format comprises means for translating numbers in a first number format to numbers stated in Modulo 256 with multiple tap points number format, said means for manipulating numbers based in an internal number format comprises means for manipulating numbers based in Modulo 256 with multiple tap point format utilizing conventional matrix transformation operations, and in which said means for translating numbers stated in the internal number format into numbers in the first number format comprises means for translating numbers stated in Modulo 256 with multiple tap points number format into numbers in the first number format.

66. A graphics accelerator circuit as claimed in claim 64 in which said first number format is an integer number format.

67. A graphics accelerator circuit as claimed in claim 64 in which said first number format is a floating point number format.

68. A graphics accelerator circuit as claimed in claim 64 in which said first number format is a FRACT number format.

69. A graphics accelerator circuit as claimed in claim 64 in which said interface means comprises means for receiving graphics information both synchronously and asynchronously.

70. A graphics accelerator circuit as claimed in claim 1 further comprising means for determining whether a particular graphics operation is to be accomplished by said graphics accelerator circuit.

71. A graphics accelerator circuit as claimed in claim 70 in which said means for determining whether a particular graphics operation is to be accomplished by said graphics accelerator circuit comprises a status register having at least one bit position representing whether a particular graphics operation is to be accomplished by said graphics accelerator circuit.

72. A graphics accelerator circuit as claimed in claim 71 in which said status register further includes a plurality of bit positions representing exceptions which preclude said graphics accelerator circuit from accomplishing a particular graphics operation, and means for ORing the bits in said bit positions representing exceptions into said at least one bit position representing whether a particular graphics operation is to be accomplished by said graphics accelerator circuit.

73. A graphics accelerator circuit as claimed in claim 72 further comprising means for transferring said precluded graphics operations to an associated processor to be conducted.

74. A graphics accelerator circuit as claimed in claim 73 in which said means for determining whether a particular graphics operation is to be accomplished by said graphics accelerator circuit operates in response to the signals provided by said means for providing signals representing the relations between each of said vertices of said quadrilateral and the boundaries of said rectangle.

75. A graphics accelerator circuit as claimed in claim 70 further comprising means for testing the condition of said at least one bit position of said status register and launching a graphics operation if that bit does not indicate an exception.

* * * * *

UNITED STATES PATENT AND TRADEMARK OFFICE
CERTIFICATE OF CORRECTION

PATENT NO. : 5,159,665
DATED : October 27, 1992
INVENTOR(S) : Priem et al.

It is certified that error appears in the above-identified patent and that said Letters Patent is hereby corrected as shown below:

In column 48, claim 29 at line 48, please delete " in " and insert -- on --.

In column 50, claim 52 at line 56, please delete " precessor " and insert -- processor --.

Signed and Sealed this

Sixteenth Day of September, 1997

Attest:

BRUCE LEHMAN

Attesting Officer

Commissioner of Patents and Trademarks